US012754649B2

(12) United States Patent
Alphin, III et al.

(10) Patent No.: US 12,754,649 B2
(45) Date of Patent: Oct. 6, 2026

(54) FEATURE DISCOVERY LAYER

(71) Applicant: MICROSOFT TECHNOLOGY LICENSING, LLC, Redmond, WA (US)

(72) Inventors: Thomas Henry Alphin, III, Kirkland, WA (US); Jan-Kristian Markiewicz, Redmond, WA (US); Jan H. Karachale, Redmond, WA (US); Benjamin J. Schoepke, Seattle, WA (US); Ryan Brennen Cuppernull, Ann Arbor, MI (US); William Scott Stauber, Seattle, WA (US); Aury Fuchsia Delmar, Seattle, WA (US); Yashraj M. Borse, Redmond, WA (US); Albert Peter Yih, Seattle, WA (US); Jeffrey Matthew Smith, Monroe, WA (US); Michael Pe Von Hippel, Seattle, WA (US); Robert Armen Mikhayelyan, Seattle, WA (US); Eric Norman Badger, Redmond, WA (US); Ryan Lee Solorzano, Redmond, WA (US); Nishitha Burman, Seattle, WA (US); Juan Sebastian Sepulveda Varon, Vancouver, WA (US); Jerome Healy, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/216,512

(22) Filed: Jun. 29, 2023

(65) Prior Publication Data

US 2024/0295942 A1 Sep. 5, 2024

Related U.S. Application Data

(60) Provisional application No. 63/487,764, filed on Mar. 1, 2023.

(51) Int. Cl.
*G06F 3/04812* (2022.01)
*G06F 3/0482* (2013.01)
(Continued)

(52) U.S. Cl.
CPC ........ *G06F 3/04812* (2013.01); *G06F 3/0482* (2013.01); *G06F 9/451* (2018.02); *G06V 30/00* (2022.01); *G06F 40/166* (2020.01)

(58) Field of Classification Search
CPC .... G06F 3/04812; G06F 3/0482; G06F 9/451; G06F 40/166; G06V 30/00
See application file for complete search history.

(56) References Cited

U.S. PATENT DOCUMENTS 9,762,651 B1 * 9/2017 Sharifi .................. G06F 16/583
10,878,471 B1 * 12/2020 Ahuja ................ G06Q 30/0623
(Continued)

FOREIGN PATENT DOCUMENTS

WO 20190118149 A1 6/2019

OTHER PUBLICATIONS

International Search Report and Written Opinion received for PCT Application No. PCT/US2024/017366, May 15, 2024, 13 pages.
International Preliminary Report on Patentability (Chapter 1) received for PCT Application No. PCT/US2024/017366, mailed on Sep. 11, 2025, 8 Pages.

*Primary Examiner* — Asher D Kells
(74) *Attorney, Agent, or Firm* — David Foster; Newport IP, LLC

(57) ABSTRACT

Disclosed is an operating system (OS) discovery mode that identifies and provides access to OS and/or third-party provided features within an applicable region of a desktop. In some configurations, once the discovery mode is activated, the content displayed by the applicable region is analyzed to identify content usable by OS and/or third-party provided features. Visual cues are rendered in the applicable region near the identified content, highlighting the availabil-
(Continued)

ity of the OS and/or third-party provided features. Users may interact with the visual cues to manipulate the underlying content or to invoke the OS and/or third-party provided features. OS and/or third-party provided features may modify content displayed by an application, launch an inline micro-experience, crop or export images, etc. While in the discovery mode, visual cues are highlighted as a discovery mouse cursor moves around the desktop. In some configurations the discovery mode is triggered automatically, causing an OS service to automatically identify and display a set of entity visual cues across the applicable region.

17 Claims, 25 Drawing Sheets

(51) Int. Cl.

| | |
|---|---|
| ***G06F 9/451*** | (2018.01) |
| ***G06F 40/166*** | (2020.01) |
| ***G06V 30/00*** | (2022.01) |

(56) References Cited

U.S. PATENT DOCUMENTS

| | | | | |
|---|---|---|---|---|
| 11,573,810 | B1 | 2/2023 | Sharifi | |
| 2008/0086700 | A1 | 4/2008 | Rodriguez et al. | |
| 2010/0031198 | A1* | 2/2010 | Zimmerman | G06F 3/0482 715/853 |
| 2012/0083294 | A1* | 4/2012 | Bray | G06V 30/1444 455/466 |
| 2013/0063442 | A1* | 3/2013 | Zaman | G06T 11/40 345/441 |
| 2014/0181692 | A1* | 6/2014 | Gupta | G06F 40/274 715/753 |
| 2015/0095855 | A1* | 4/2015 | Bai | G06F 16/5846 715/863 |
| 2015/0326642 | A1* | 11/2015 | Cao | G06F 9/452 709/204 |
| 2016/0147725 | A1* | 5/2016 | Patten | G06F 40/169 715/230 |
| 2021/0142763 | A1 | 5/2021 | Notani | |
| 2023/0069587 | A1* | 3/2023 | Lukyanenko | G06F 40/35 |

* cited by examiner

FEATURE DISCOVERY LAYER

PRIORITY APPLICATION

This application claims the benefit of and priority to U.S. Provisional Application No. 63/487,764, filed Mar. 1, 2023, the entire contents of which are incorporated herein by reference.

BACKGROUND

Software applications are programmed using functionality provided by an operating system (OS), such as reading and writing to files, sending and receiving data over a network, etc. However, many applications do not take advantage of the full suite of features made available by the OS. For example, an application may have been developed before an OS-provided feature was available. In other circumstances, the application developer may not have had the time, resources, or interest to leverage a particular OS-provided feature or third-party provided feature. OS and/or third-party provided features may also go unused because users do not know how to invoke them, or because the user is unaware of the feature. Increasingly, these OS and/or third-party provided features leverage machine learning and/or other artificial intelligence techniques. Among other disadvantages, failing to take advantage of OS and/or third-party provided features limits user productivity and causes computing resources to be used inefficiently.

It is with respect to these and other considerations that the disclosure made herein is presented.

SUMMARY

Disclosed is an operating system (OS) discovery mode that identifies and provides access to OS and/or third-party provided features within an applicable region of a desktop. In some configurations, once the discovery mode is activated, the content displayed by the applicable region is analyzed to identify content usable by OS and/or third-party provided features. Visual cues are rendered in the applicable region near the identified content, highlighting the availability of the OS and/or third-party provided features. Users may interact with the visual cues to manipulate the underlying content or to invoke the OS and/or third-party provided features. OS and/or third-party provided features may modify content displayed by an application, launch an inline micro-experience, crop or export images, etc. While in the discovery mode, visual cues are highlighted as a discovery mouse cursor moves around the desktop. In some configurations the discovery mode is triggered automatically, causing an OS service to automatically identify and display a set of visual cues across the applicable region.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
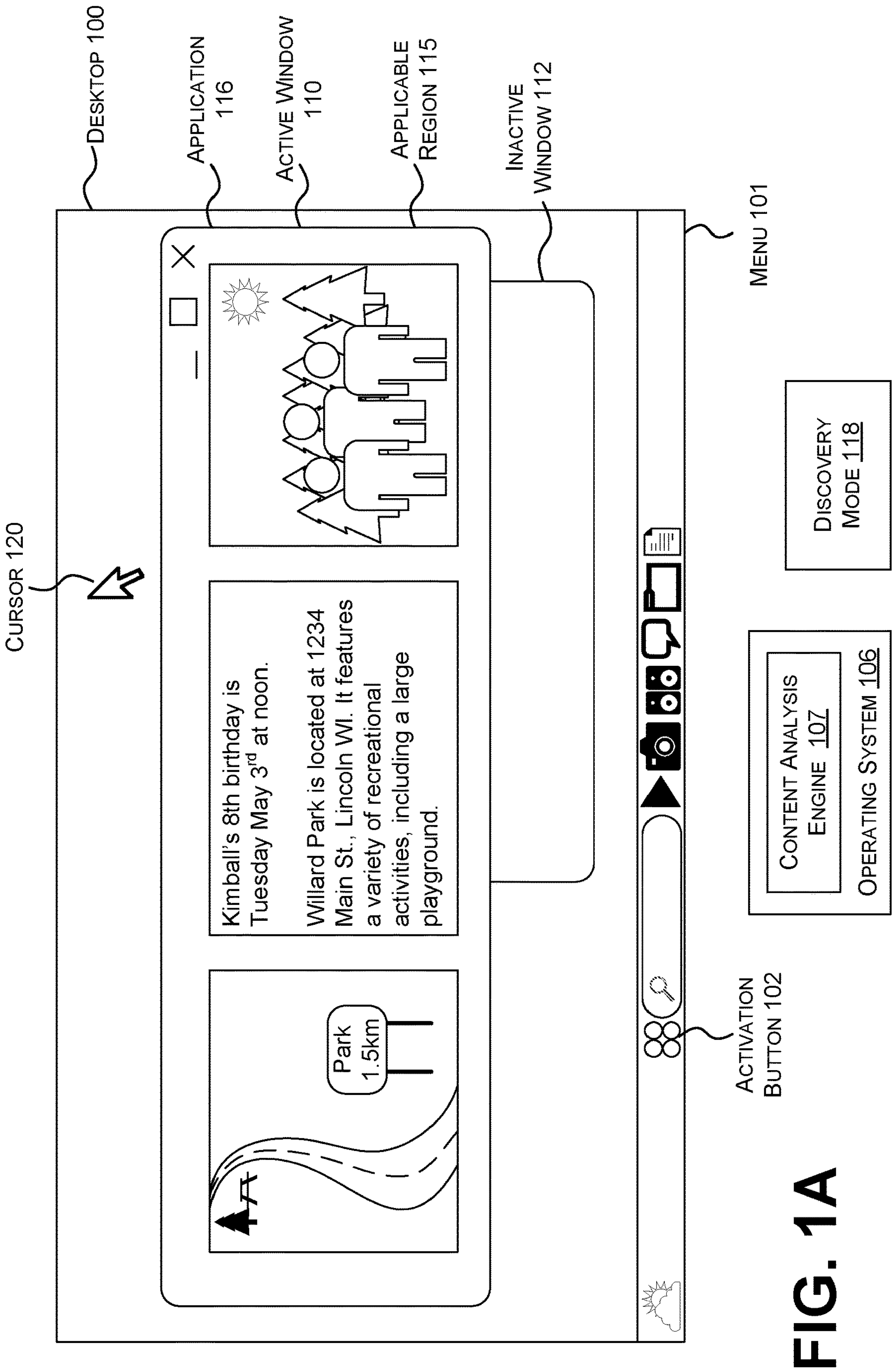
FIG. 1A illustrates an active window of an application running on a desktop.

FIG. 1A illustrates active window 110 of application 116. Application 116 is running within desktop 100, which is a user interface of operating system 106. Active window 110 partially occludes inactive window 112, which is also running within desktop 100. Inactive window 112 may be part of application 116 or a different application. Desktop 100 includes menu 101 which contains, among other items icons of active and/or pinned applications, a search bar, and activation button 102. In the MICROSOFT WINDOWS operating system, menu 101 may also be a taskbar, a title bar, a ribbon menu.

Activation button 102 is a graphical button found on menu 101. In some operating systems, such as MICROSOFT WINDOWS, selecting activation button 102 displays a menu that provides access to various applications, files, and settings on a computer. Often, keyboards have a dedicated key or combination of keys that, when pressed, triggers activation button 102. Activation button 102 may also be selected by moving cursor 120 over activation button 102 and selecting it, using voice activation, or by any other technique commonly used to select a button.

Cursor 120 represents the current location of a mouse pointer on desktop 100. As illustrated, cursor 120 may be represented by a default operating system pointer icon. Cursor 120 is used to select, drag, and drop objects on the screen. The shape and appearance of cursor 120 can change depending on the type of operation being performed. For example, moving the cursor over a link in a web browser may cause the cursor to change to a hand icon. The shape and appearance of the cursor can also change depending on whether OS 106 has entered a discovery mode 118, as discussed below, such as in conjunction with FIG. 1B.

As referred to herein, an active window is an application window with a graphical user interface (GUI) that is currently displayed in the foreground and has focus, meaning it is the window that receives keyboard, mouse, microphone, and/or other types of input. For example, mouse input is supplied to active window 110 when cursor 120 hovers over or clicks on active window 110. The active window is often indicated by a highlighted and/or visually distinct title bar. Typically, only one window can be active at a time. Inactive window 112 is a window that is currently not in the foreground, but that is still open and accessible to the user. Inactive window 112 does not have the OS focus, meaning it does not receive keyboard or mouse input.

Application 116 is a program designed to perform a specific task or set of tasks for the user. Applications are designed to run on various operating systems, such as WINDOWS, MACOS, and LINUX. Applications can be as simple as a calculator app, or as complex as a video game. Some common examples of computer applications include word processors, web browsers, email clients, and media players.

As illustrated, active window 110 displays a block of text surrounded by two images. This content is illustrative and not limiting, and any other type of content is similarly contemplated, including spreadsheets, video games, web pages, maps, computer aided design figures, videos, and the like. Application 116 may draw content in a variety of ways using a variety of technologies such as 2D graphics, 3D graphics, vector graphics, raster graphics, animation, composition, ray tracing, immediate mode, retained mode, or the like.

Operating system 106 includes content analysis engine 107. While described in more detail below in conjunction with FIG. 1B, content analysis engine 107 analyzes the graphics output of and/or underlying data associated with active window 116 to identify content usable by OS and/or third-party provided features. In this way, OS and/or third-party provided features can be made available to a user even if application 116 was not designed to utilize them, and without participation by application 116.

As referred to herein, an applicable region 115 of the desktop 100 refers to one or more regions analyzed by content analysis engine 107. Applicable region 115 may include a portion of a window, such as an application-drawn portion of active window 110 or a portion of inactive window 112 that is visible. Applicable region 115 may also include portions of a window that are not visible. Additionally, or alternatively, applicable region 115 may include a single active window such as active window 110, two or more windows associated with the same application 116, or a set of windows associated with two or more applications.

In some configurations, applicable region 115 may include windows that were active within a defined period of time, such as windows that had been active in the past five minutes. In some configurations, applicable region 115 may include windows from applications that were most recently used, e.g., windows from the three most recently active applications. In some configurations, applicable region 115 may include windows from applications selected based on frequency of use. For example, if a user frequently uses an email application, applicable region 115 may be defined to include windows associated with the email application, as OS and/or third-party provided features may have a greater opportunity to provide benefit to the user. In other embodiments, infrequently used applications may be selected for inclusion in applicable region 115 so as to highlight features the user may not be aware of. Applicable region 115 may also be selected to include applications based on how frequently OS and/or third-party provided features have been invoked from different applications. Applicable region 115 may also include a portion of the desktop. Applicable region 115 may be determined based on a combination of these criteria, among other criteria.

Figure 1B:
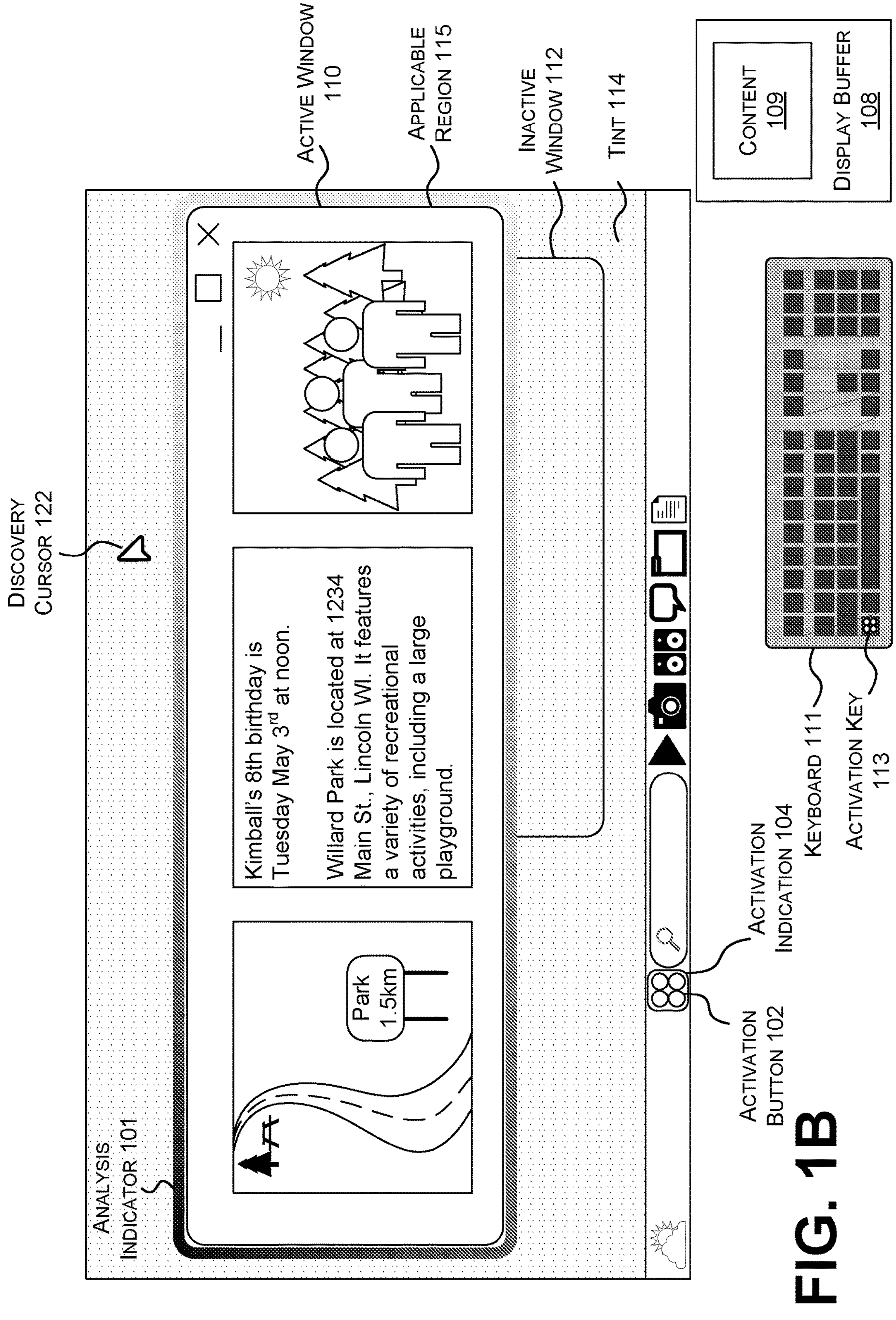
FIG. 1B illustrates activating a discovery mode.

FIG. 1B illustrates activating discovery mode 118. In some configurations, discovery mode 118 is activated in response to a user holding down an activation key 113 on keyboard 111. Additionally, or alternatively, discovery mode 118 may be activated by mouse click, mouse press and hold, touch gesture such as a swipe, voice activation, or the like. Activation key 113 may perform other functions when pressed and released in a conventional manner (i.e., not an extended hold), such as displaying a menu for launching applications. In some configurations, when discovery mode 118 is triggered by holding activation key 113, a mouse press and hold, or a touch press, discovery mode 118 remains active until the user releases the trigger.

Discovery mode 118 may also be entered by selecting an "enter discovery mode" action from a menu. For example, a user may move cursor 120 over activation button 102, click the right mouse button to activate a context menu, and select "enter discovery mode" from the context menu. A context menu may similarly be accessed by performing a right-click or equivalent action on a window or over the desktop itself. When entered via a context menu, discovery mode 118 may continue without the user having to hold down a key. The user may exit discovery mode 118 by selecting a "leave discovery mode" action from the context menu or otherwise dismissing discovery mode 118. In some configurations, once discovery mode 118 has been entered, activation indication 104 appears proximate to activation button 102.

As illustrated, activation indication 104 highlights activation button 102. Activation indication 104 may call attention to activation button 102 by shading, bolding, increasing prominence, or the like. Activation indication 104 is one indication that discovery mode 118 has been entered. Other indications include a different mouse cursor icon, analysis indicator 101, tint 114, and the like.

In some configurations, upon entering discovery mode 118, content analysis engine 107 analyzes the graphics displayed in applicable region 115. As illustrated in FIG. 1B, applicable region 115 coincides with active window 110 of application 116, but as discussed above applicable region 115 could include only a portion of active window 110, additional windows of application 116, and/or windows from other applications, and the like. Active window 110 is the applicable region 115 for many of the examples discussed herein, but one of ordinary skill will understand that the same techniques are equally applicable to the other types of applicable regions discussed above.

As illustrated, content analysis engine 107 analyzes active window 110 to identify content usable by OS and/or third-party provided features. Content analysis engine 107 may analyze a snapshot of the graphics displayed in active window 110, or content analysis engine 107 may observe the graphics displayed in active window 110 over time.

OS and/or third-party provided features may be provided by operating system 106. OS and/or third-party provided features may also be provided by other vendors via a plugin mechanism. In some configurations, the plugin mechanism allows configuration or customization of how applicable region 115 is determined. The plugin mechanism may also allow configuration or customization of which high-level entities are identified, how high-level entities are identified, the identification of entities, which entities are highlighted with visual cues, which visual cues are used for which entities, which OS and/or third-party provided features are made available via the visual cues, and/or the implementation of a particular OS and/or third-party provided feature.

Content analysis engine 107 may read the graphics displayed by active window 110 from a display buffer 108. Display buffer 108 is a portion of computer or GPU memory dedicated to storing image data that will be displayed on a computer screen or monitor. The graphics displayed by active window 110 are also referred to herein as content 109 stored in display buffer 108.

Content 109 may be stored in the form of pixels and is periodically updated by application 116 to produce the graphics displayed by active window 110. Additionally, or alternatively, content 109 may be stored in a vector graphics format that mathematically defines the content. Content 109 may also be stored in the form of instructions for drawing content, such as drawing primitives, a document object model (DOM), or the like.

Reading content 109 directly from display buffer 108 enables portions of content 109 to be identified regardless of the technology used to generate that content. For example, an image displayed by active window 110 may be analyzed as an array of pixels, independent of whatever compression techniques were used to store the image on disk.

As another example, text displayed in active window 110 may be analyzed independent of which library was used to generate the text. Raw text may be identified from pixel-based content with optical character recognition (OCR). If content 109 contains a series of drawing commands, then text may be inferred by analyzing the drawing commands that output text to display buffer 108.

Accessing raw display buffer data in this way allows a greater amount of content to be analyzed, increasing the likelihood that content usable by OS and/or third-party provided features will be identified. For example, accessing content 109 from display buffer 108 enables text contained in an image to be recognized and made selectable to the user. Without the ability to analyze content 109 from display buffer 108 this text would remain unselectable.

In some configurations, analysis indicator 101 visually indicates that content analysis engine 107 of OS 106 is analyzing active window 110 for content that may be used by OS and/or third-party provided features. As illustrated, analysis indicator 101 is a band that encircles active window 110. In some configurations, analysis indicator 101 may appear as a tint or other overlay over some or all of the applicable region 115. Analysis indicator 101 may alert a user that active window 110 is being analyzed by changing color or shape. For example, analysis indicator 101 may shimmer, color cycle, or otherwise animate and/or indicate that content analysis engine 107 is in the process of identifying content within active window 110.

In some configurations, tint 114 is an example of shading applied to a portion of desktop 100 that is not currently being analyzed by content analysis engine 107. As illustrated, tint 114 covers inactive window 112 as well as portions of desktop 100 that do not contain any windows. In some configurations, tint 114 may also cover menu 101. Tint 114 reinforces that active window 110 is being analyzed, not inactive window 112 or other portions of desktop 100.

OS 106 may change one or more visualizations upon entering discovery mode 118. For example, discovery cursor 122 may replace the default OS cursor icon 120. In other configurations, the default OS cursor 120 may change color. In some configurations, discovery cursor 122 shares colors, animations, and other properties with analysis indicator 101.

Analysis indicator 101, discovery cursor 122, and entity visual cues discussed below, for example in FIG. 1C, together form a layer on top of active window 110 for identifying and providing access to OS and/or third-party-provided features. In this context, a layer refers to a collection of user interface elements that appear between active window 110 and the user. Consistent with appearing over active window 110, user interface elements in the layer may intercept user interface commands that would otherwise go directly to active window 110.

Figure 1C:
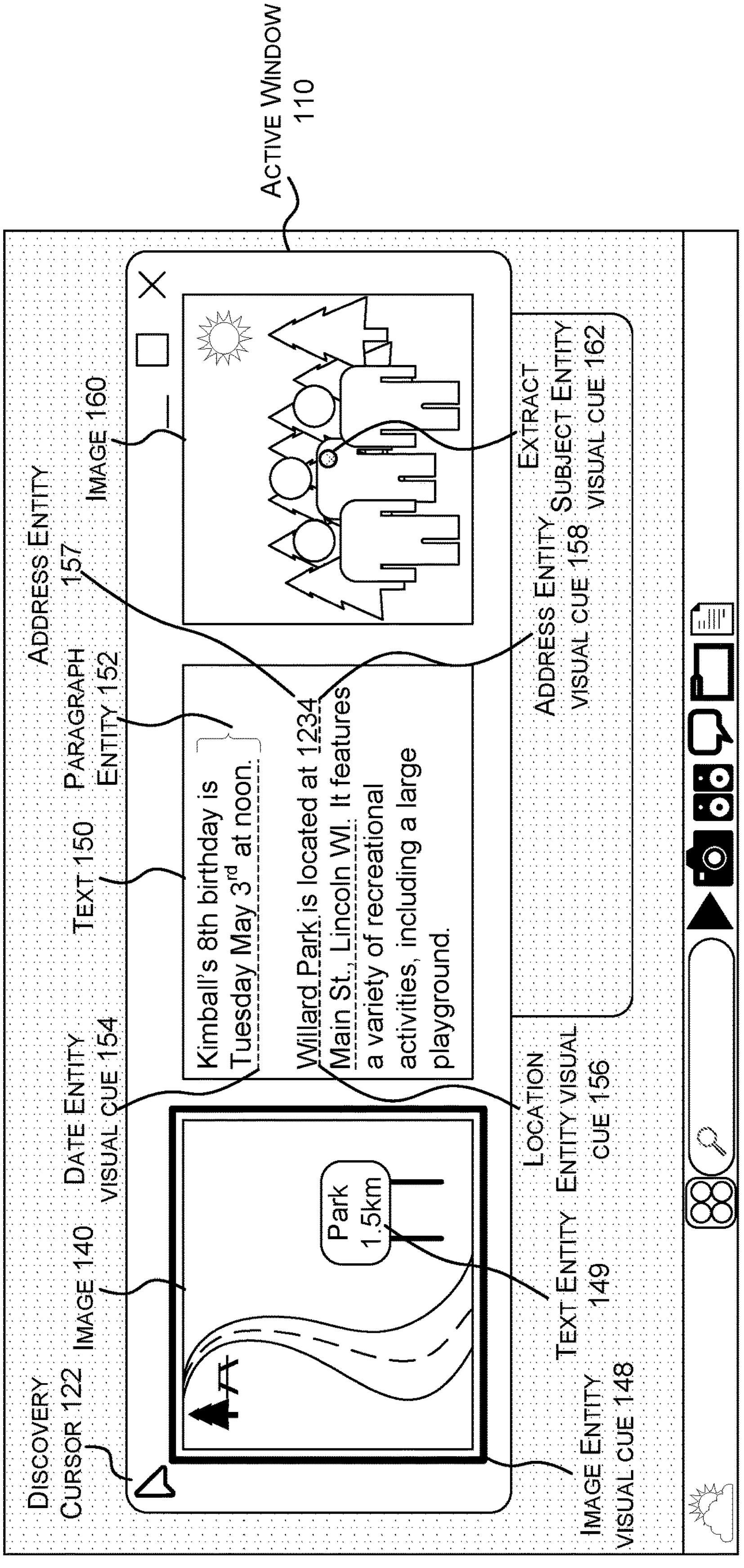
FIG. 1C illustrates visual cues overlaid on entities in the active window.

FIG. 1C illustrates visual cues overlaid near entities that content analysis engine 107 discovered in active window 110. As referred to herein, an entity refers to a portion of content displayed by active window 110 that can be consumed by an OS and/or third-party provided feature. For example, an OS and/or third-party provided feature may show a location on a map. This OS and/or third-party provided feature may use an address identified by content analysis engine 107 to show a location of the address on a map.

In some configurations, content analysis engine 107 first segments the content displayed by active window 110 into images, text blocks, UI elements (such as buttons, scroll bars, and dialog boxes), and other high-level entities. As illustrated, the content displayed by active window 110 has been divided into three high-level entities: image 140, text 150, and image 160. In some configurations, machine learning and/or artificial intelligence techniques are used to identify high level entities.

As illustrated, image 140 is highlighted by image entity visual cue 148. Image entity visual cue 148 is depicted as a border around image 140, but other means for highlighting image 140 and other entities discussed herein are similarly contemplated. For example, image entity visual cue 148 may cause a shadow to appear under image 140. Furthermore, image entity visual cue 148 may be animated. Image entity visual cue 148 may also highlight image 140 by causing image 140 to move around the screen, e.g., by shifting back and forth. Image entity visual cue 148 may also highlight image 140 by causing surrounding content to be dimmed—i.e., displayed with reduced brightness. While discussed in more detail below in conjunction with FIGS. 6A-6C, image entity visual cue 148 may appear or disappear, change color, or animate in response to increased or decreased distance from discovery cursor 122.

In some configurations, entities are nested within one another, creating a hierarchy of entities. For example, if image 140 contains text, content analysis engine 107 may identify a text entity 149 within image 140, such as depicted below in conjunction with FIG. 1D.

In some configurations, visual cues for all entities are displayed upon entering discovery mode 118. In other configurations, visual cues for a portion of the entities are displayed upon entering discovery mode 118. For example, a visual cue for the top-level entity(ies) may be displayed upon entering discovery mode 118, while visual cues for nested entities are not displayed until a parent entity, or an action associated with the parent entity, is selected. Delaying or otherwise staggering the display of entity visual cues in this way reduces screen clutter, reduces the number of choices that the user is presented with at any given time, decreases and/or defers the consumption of computing resources, and improves human-computer interaction, among other benefits.

In some configurations, in addition to delaying the display of visual cues for nested entities, content analysis engine 107 may defer analyzing the content of a parent entity until it is selected. Child entities may then be identified during the analysis of the parent entity. Delaying analysis in this way reduces the time and computing resources it takes to present an initial set of entity visual cues when entering discovery mode. Deferring computation also may increase efficiency, including if processing that otherwise would have occurred is skipped entirely.

Text 150 has been processed by content analysis engine 107 to identify a number of entities. Paragraph entity 152 is one of a number of entities that represent individual paragraphs in a block of text. A date entity, such as "Tuesday May 3$^{rd}$ at noon" may be identified by analyzing the text of text 150 itself. In some configurations, machine learning and/or artificial intelligence techniques are applied to distinguish text that is usable by OS and/or third-party provided features, such as dates, times, locations, and the like. Other illustrated examples of text-based entities are the location entity "Willard Park" and the address entity 157 "1234 Main St., Lincoln, WI".

Each of the entities mentioned above has been overlaid with corresponding entity visual cues that can be used to identify and/or invoke OS and/or third-party provided features relevant to the associated entity. For example, date entity visual cue 154 appears as an underline under the text of the date entity "Tuesday May 3$^{rd}$ at noon". Similarly, location entity visual cue 156 appears as a line under the "Willard Park" location entity and address entity visual cue 158 appears as a line under the "1234 Main St., Lincoln WI" entity 157.

Images 140 and 160 may also be processed by content analysis engine 107 using one or more image recognition and/or processing techniques. For example, within image 160, content analysis engine 107 has identified subjects of a photograph or image. Subjects of a photograph or image may be people, animals, or other prominently displayed objects. What constitutes a subject may be customized by plugins that provide the OS and/or third-party feature.

In some configurations, subjects are identified based on an outline and content of the object itself. For example, edge detection and facial recognition may be used to identify a person within a photograph as the subject. Subjects may also be identified based on a location of an object in the photo. For example, a person located in the center of a photograph may be identified as the subject, while a person in the background may not. The subject of a photo may also be determined based on whether the object is in focus, and/or one or more user-specified settings. As illustrated, content analysis engine 107 identifies a subject of a photograph or image by overlaying extract subject entity visual cue 162 on or near the subject (e.g., the three people in the foreground of the photograph or image).

Figure 1D:
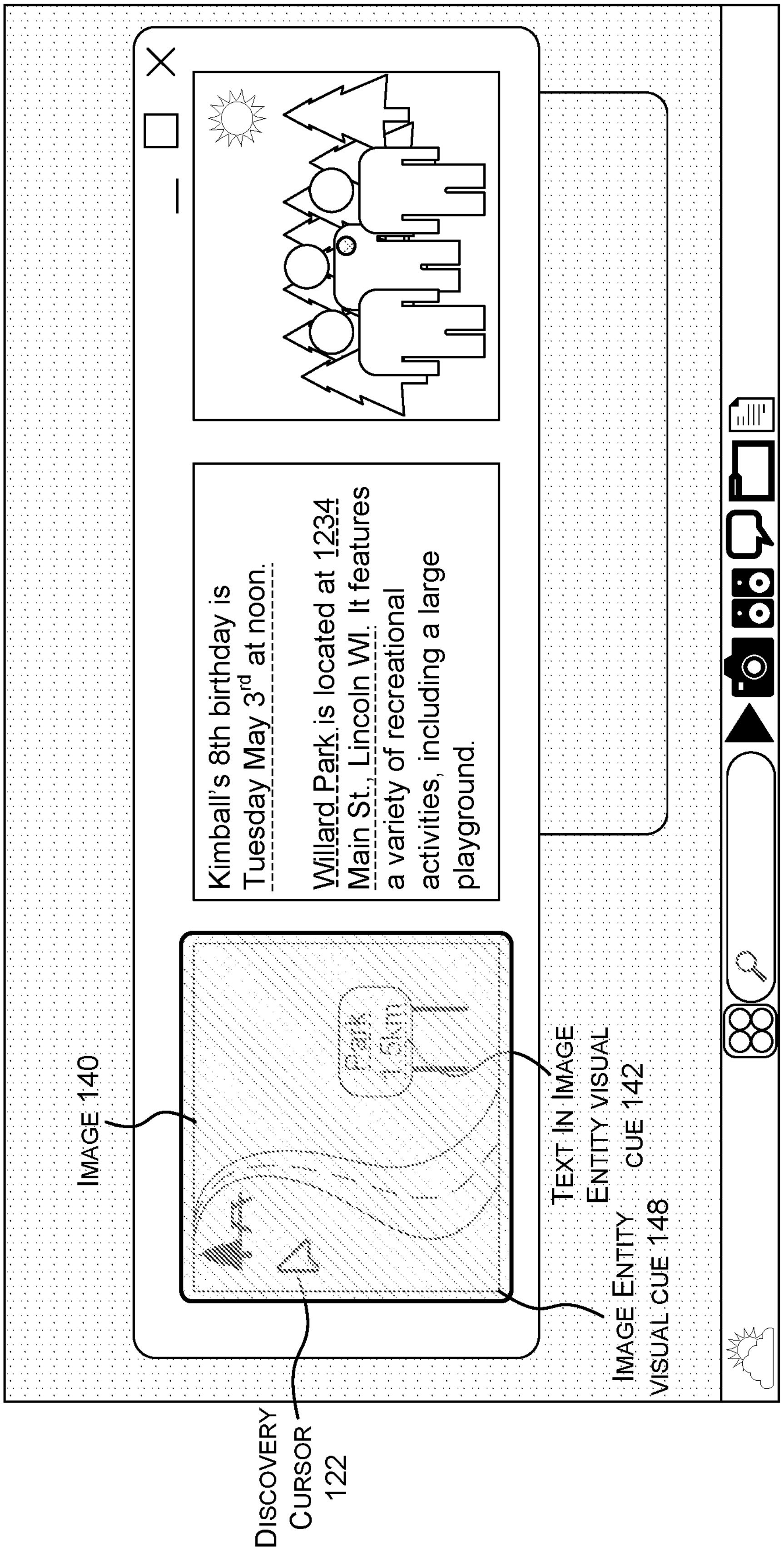
FIG. 1D illustrates highlighting an image entity visual cue in response to a discovery cursor hover-over.

FIG. 1D illustrates highlighting image entity visual cue 148 in response to a hover-over by discovery cursor 122. In this example, image entity visual cue 148 has been shaded. Alternatively or additionally, image entity visual cue 148 may be highlighted by changing color or thickness of the border appearing around image 140.

As discussed briefly above, content analysis engine 107 may analyze image 140 for nested entities in response to discovery cursor 122 hovering over image entity visual cue 148. Nesting entities in this way provides a number of benefits over identifying and/or displaying all entity visual cues at once. First, identifying a top-level entity such as image 140 without having to further identify child entities decreases latency and reduces computing costs. Furthermore, displaying numerous entity visual cues (e.g., from all levels in an entity hierarchy), such as text contained within an image, may clutter the screen, degrading the user experience.

As illustrated, content analysis engine 107 has identified the text "Park 1.5 km" entity within a sign identified in image 140. Accordingly, content analysis engine 107 has overlaid text-in-image entity visual cue 142 (hereinafter "visual cue 142") over the identified text. Visual cue 142 appears as a line under the text "Park 1.5 km".

Figure 1E:
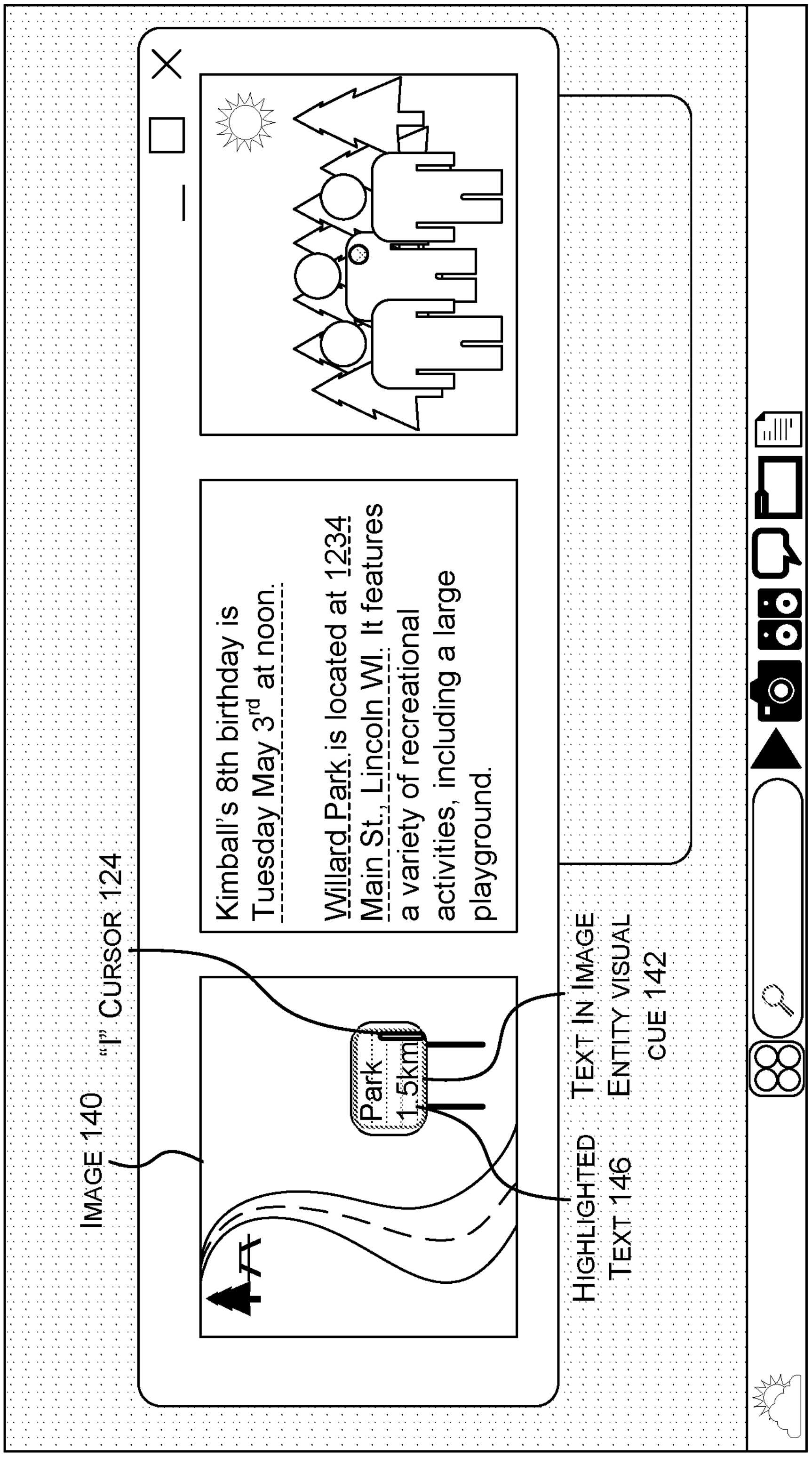
FIG. 1E illustrates highlighting a text visual cue nested within an image entity.

FIG. 1E illustrates highlighting text nested within image 140. Discovery cursor 122 has been moved over visual cue 142. In response, discovery cursor 122 may become "I" cursor 124, indicating that the user may select and/or otherwise interact with the highlighted text. Moving discovery cursor 122 over visual cue 142 also caused visual cue 142 to highlight the underlying text 146: "Park 1.5 km."

Figure 1F:
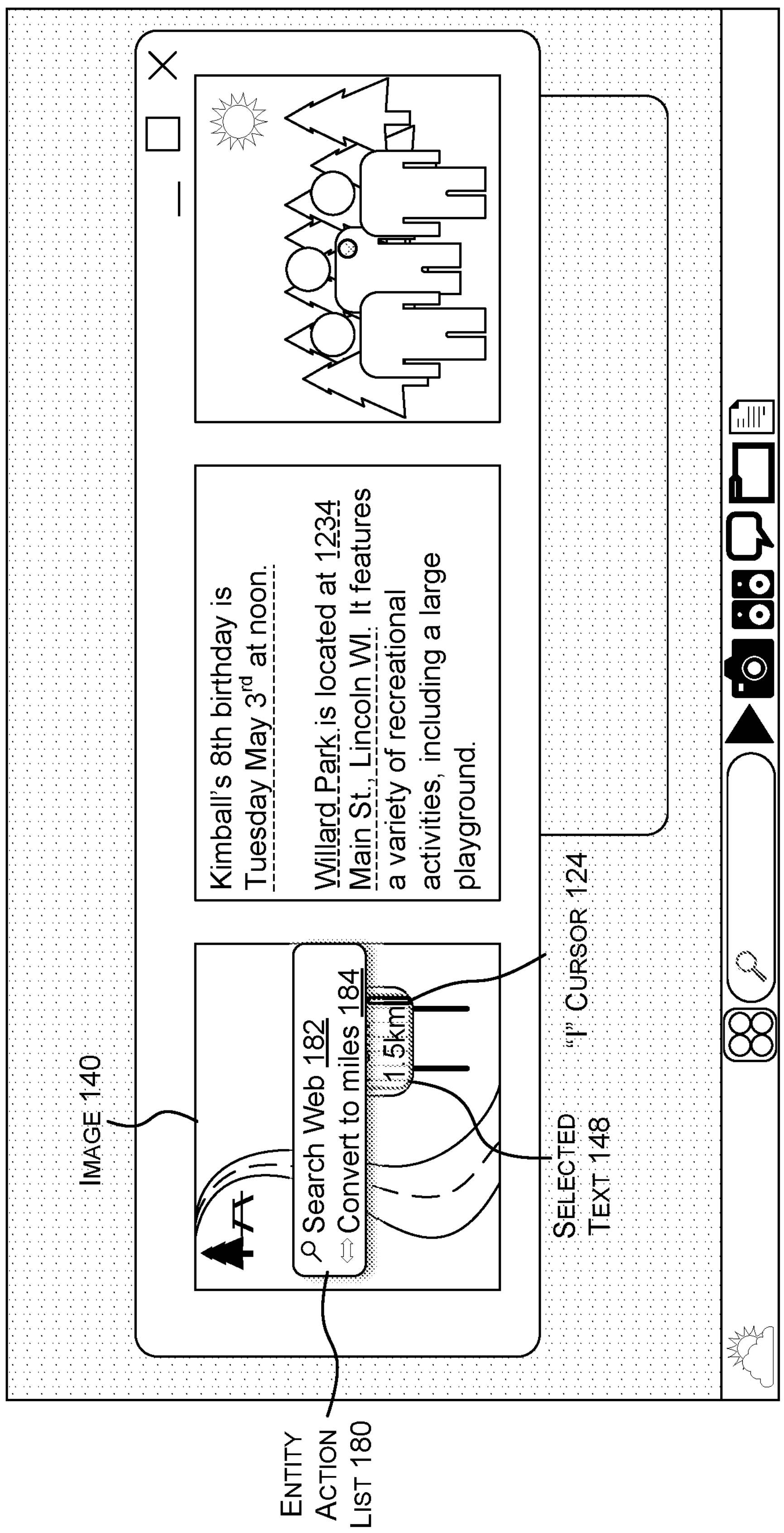
FIG. 1F illustrates an entity action list displayed in response to selecting the nested text visual cue.

FIG. 1F illustrates an entity action list 180 displayed in response to receiving a selection of the text highlighted by text-in-image visual cue 142. Visual cue 142 may be selected by clicking a mouse or touchpad button while "I" cursor 124 is over visual cue 142. Other input methods, e.g., a touch press or swipe, voice command, eye gaze, etc., are similarly contemplated. In response to being selected, a shading style associated with the text-in-image entity visual cue 142 may be changed from highlighted text 146 to selected text 148. This change to the shading style conveys to the user that the selection of text 148 was successful and that entity action list 180 is associated with the selected text 148.

As referred to herein, an entity action list displays a list of actions that may be invoked for an underlying entity. In some configurations, a visual cue indicates which visual cue the entity action list is associated with, such as changing the shading of the corresponding entity. Entity action list 180 contains two entity actions selected by content analysis engine 107: search web 182 and convert to miles 184. Certain entity actions may be included in entity action list 180 because they are generally applicable to any displayed content and/or a particular type of content. For example, content analysis engine 107 may select the search web 182 entity action because this action is made available any time text is selected. Other entity actions may be included in entity action list 180 because they are relevant to the particular content selected and/or attributes of the user and/or the computing device. For example, content analysis engine 107 may select the convert to miles 184 action based on having identified a measure of distance ("1.5 km") in the text and/or a geolocation of the computing device.

Content analysis engine 107 may use artificial intelligence techniques such as machine learning and natural language processing to identify distances such as "1.5 km." Additionally, or alternatively, content analysis engine 107 may use regular expressions, lexers, parsers, finite state machines, or other known techniques to identify text within a text entity that can be utilized by an OS and/or third-party provided feature. Similar techniques may be used to identify dates, times, email addresses, web addresses, and the like. The same techniques may also be used to identify named entities such as locations, people, businesses, countries, and the like.

Content analysis engine 107 may provide a default set of entities to identify, visual cues to display, and entity actions to include in entity action list 180. Content analysis engine 107 may also invoke plugins to perform some or all of these operations. For example, a plugin may define the entity actions to be displayed in entity action list 180. Content analysis engine 108 may query multiple plugins for entity actions to add to entity action list 180.

Figure 1G:
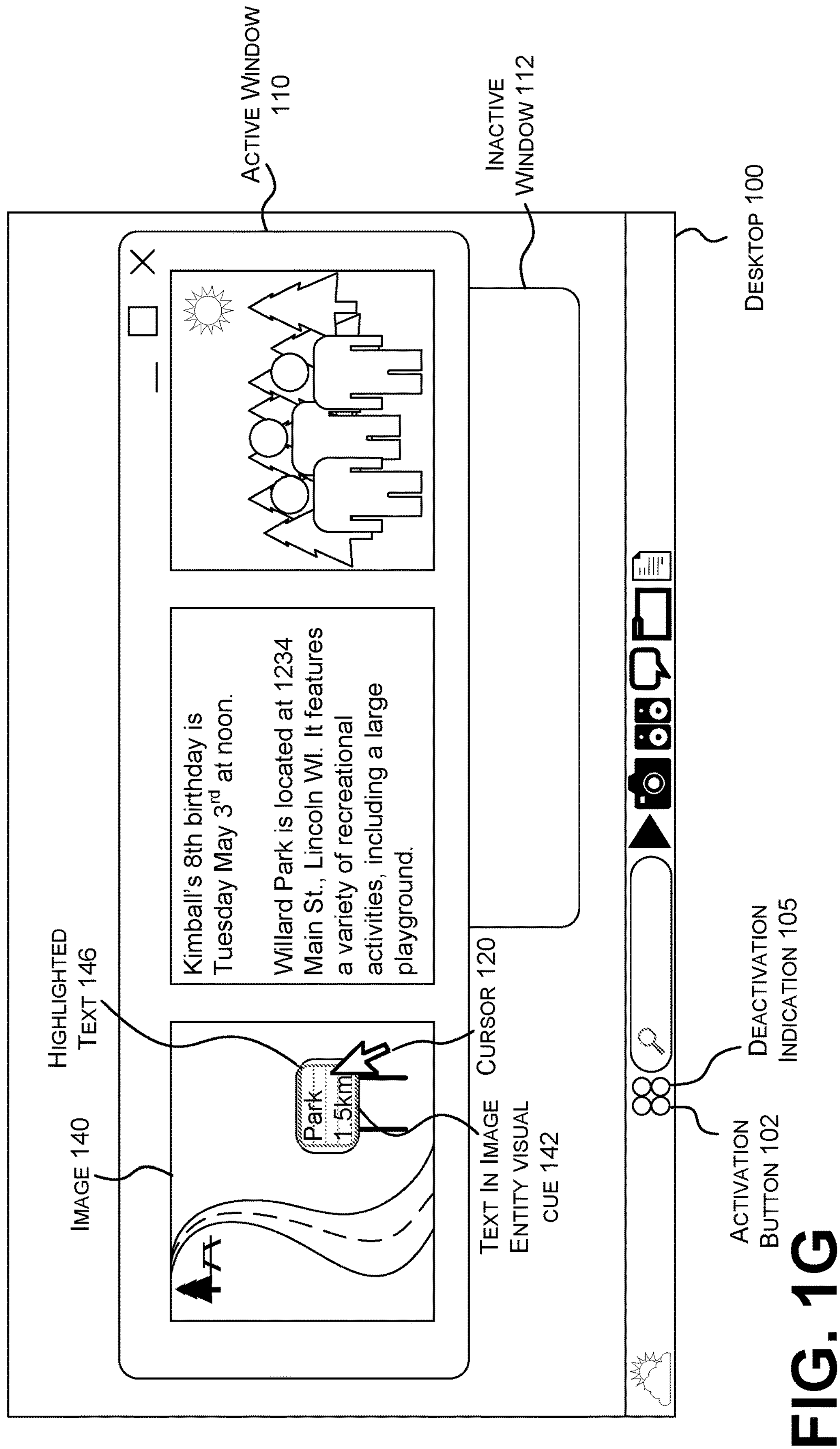
FIG. 1G illustrates de-activation of the discovery mode.

FIG. 1G illustrates de-activation of discovery mode 118. The manner of exiting discovery mode 118 may depend on how discovery mode 118 was entered. For example, if discovery mode was entered by holding down activation key 113, then releasing activation key 113 may cause deactivation of discovery mode. Discovery mode 118 may also be exited by pressing a designated key, such as the "escape" key, by selecting "exit discovery mode" from a context menu, or in any other suitable manner. Deactivation indication 105 visually indicates that discovery mode 118 has exited. For example, deactivation indication 105 may revert activation button 102 to a non-invoked state.

In some configurations, in response to deactivating discovery mode 118, all entities, highlighting, analysis indicators, and other UI elements generated by discovery mode 118 are removed. In other configurations, entities that were most recently selected or otherwise interacted with may be left in place. This is illustrated in FIG. 1G by visual cue 142 remaining visible, even though the other entity visual cues have been removed and "I" cursor 124 has returned to the default OS icon of cursor 120.

Figure 2A:
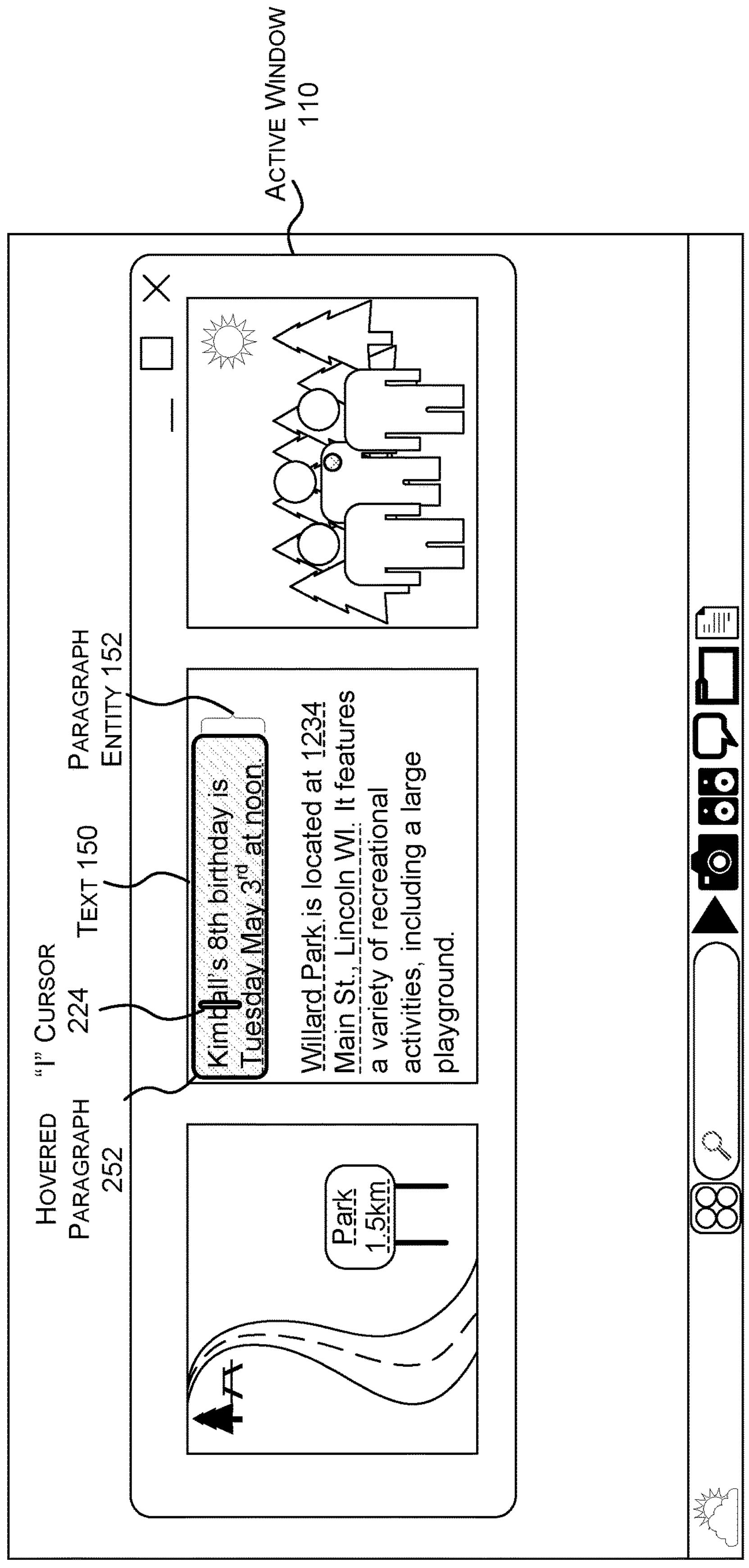
FIG. 2A illustrates highlighting a paragraph entity within a text entity.

FIG. 2A illustrates highlighting a paragraph entity 152 within text 150. Content analysis engine 107 may use machine-learning based or traditional image segmentation techniques to distinguish text, images, UI controls, and other sub-sections of an application-generated image obtained from display buffer 108. Content analysis engine 107 may also distinguish and identify content using screen description frameworks, such as accessibility frameworks, in which applications provide metadata about the content 109 of buffer 108. When a text entity is image-based, content analysis engine 107 may use optical character recognition to extract text. When the text entity is obtained from a screen description framework, text may be obtained directly from the framework. In either way, OS 106 is able to identify and utilize content generated by application 116 that would otherwise be opaque and inaccessible.

Discovery cursor 122 has been moved over paragraph entity 152, becoming "I" cursor 224. Moving cursor 122 over paragraph entity 152 also causes hovered paragraph highlighting 252 to be displayed over paragraph entity 152. Hovered paragraph highlighting 252 indicates to a user that content generated by active window 110 has been identified as text, and that the identified text may be operated on by one or more OS and/or third-party provided features.

Paragraph entity 152 is an example of an entity that is not highlighted by a visual cue until discovery cursor 122 has been moved over text 150 and/or paragraph entity 152. However, in other embodiments, a visual cue may be displayed proximate to paragraph entity 152 when entering discovery mode 118. For example, a vertical bar visual cue may be displayed in the margin next to paragraph entity 152.

Changing discovery cursor 122 into "I" cursor 224 indicates that the user may insert a caret into paragraph entity 152, select text within paragraph entity 152, and perform other operations that would typically require knowledge of what text had been drawn to window 110. A caret refers to a vertical bar inserted between characters of text that indicates where additions, edits, or selections of text will occur. These text-manipulation operations are enabled by content analysis engine 107 identifying what text has been drawn where in active window 110. The shape and style of discovery cursor 122 and "I" cursors 124 and 224 are not limiting—other cursor icons and styles are similarly contemplated.

Figure 2B:
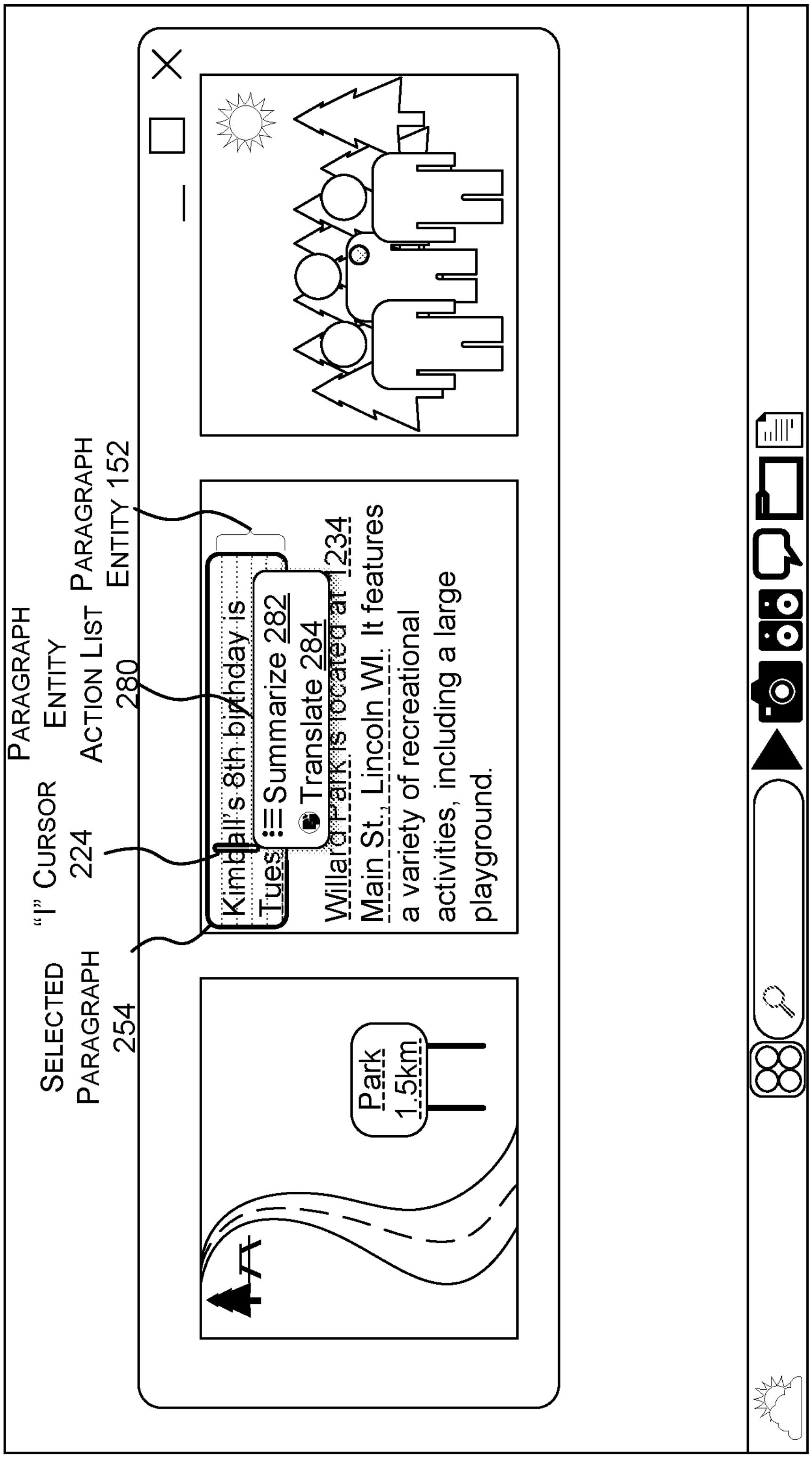
FIG. 2B illustrates an entity action list displayed in response to selecting the highlighted paragraph entity.

FIG. 2B illustrates paragraph entity action list 280 displayed in response to selecting the highlighted paragraph entity 152. For example, a user may have selected highlighted paragraph entity 152 by clicking a right mouse button while "I" cursor 224 was over paragraph entity 152. In response to the selection, the highlighting of paragraph entity 152 changes to selected paragraph 254, giving a visual indication of the entity that paragraph entity actions list 280 is associated with.

Paragraph entity actions list 280 includes two entity actions: summarize 282 and translate 284. Content analysis engine 107 may have selected these entity actions based on an analysis of the text of paragraph entity 152. These entity actions may also be based on the location of "I" cursor 224 within paragraph entity 152 when the selection was made.

In some configurations, when two or more entities are associated with the same text, only entity actions from one of the entities are displayed in an entity action list. For example, a precedence order may determine which entity is selected, and therefore which entity actions are made available in the entity action list. In other configurations, when two or more entities are associated with the same text, the entity actions from each entity are aggregated into a single entity action list. Similar techniques may be used to select entity actions for other types of entities, e.g., image-based entities. In the example illustrated by FIGS. 2A and 2B, the selected paragraph 254 may be determined to include two entities, as described above: (1) paragraph entity 152, and (2) date entity 154. Different entity actions may be surfaced based on, for example, which entity the user is predicted to be interested in. For example, based on the cursor 224 position (e.g., over the paragraph entity 152, in particular Kimball's name, but not over the date entity 154) and/or other factors, text-based paragraph entity actions 280 may be selected, such as those illustrated in FIG. 2B. If the cursor 224 were alternatively positioned over the date entity 154 or the user were otherwise predicted to be more interested in this entity, other paragraph entity actions may be surfaced, such as a create calendar event action.

Figure 2C:
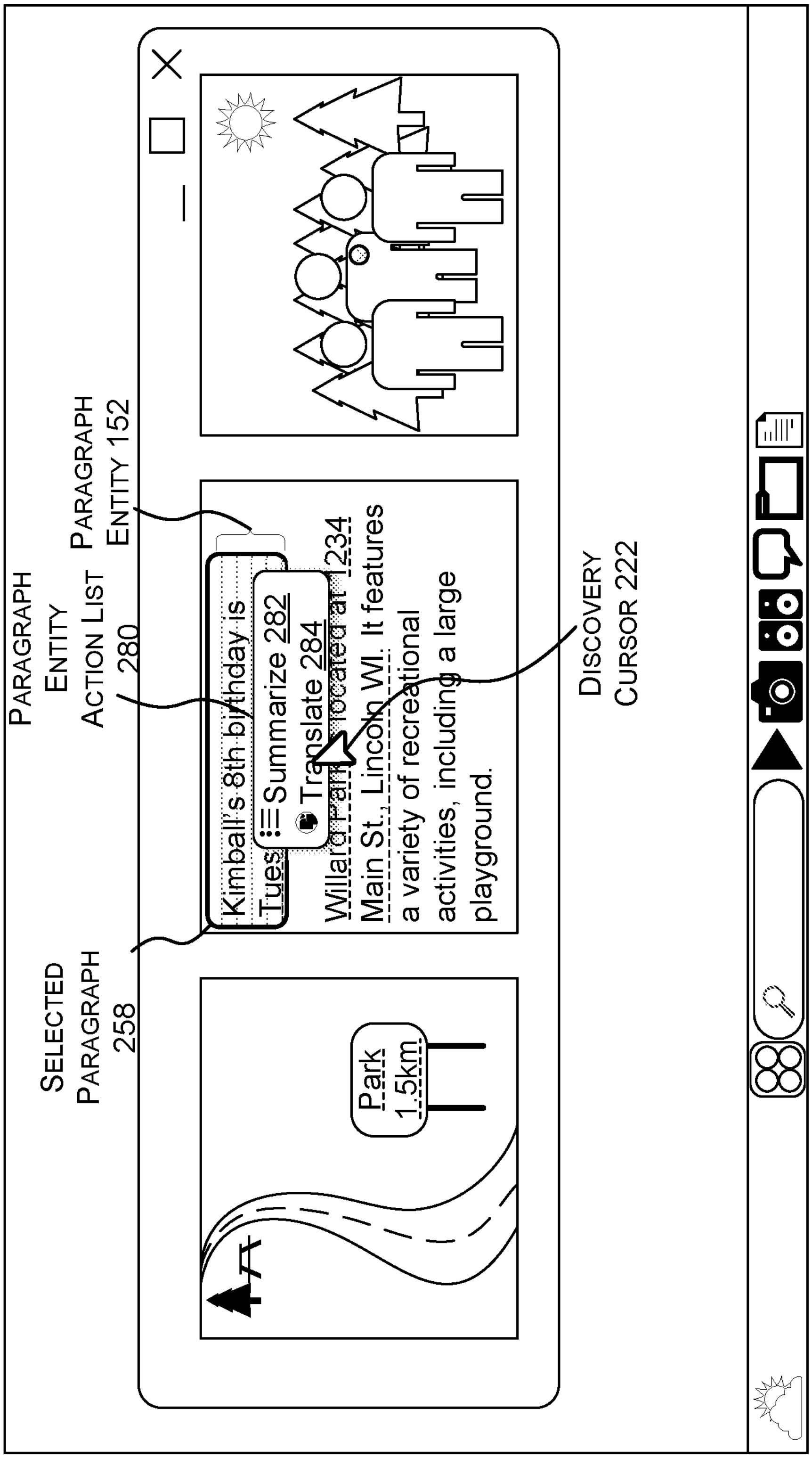
FIG. 2C illustrates selecting an action from the entity action list.

FIG. 2C illustrates receiving a selection of an entity action 284 from the paragraph entity actions list 280. As illustrated, the "translate" entity action 284 is selected by discovery cursor 222. In some examples, as illustrated, discovery cursor 222 replaces "I" cursor 224 when the cursor moves from paragraph entity 152 to paragraph entity actions list 280.

Figure 2D:
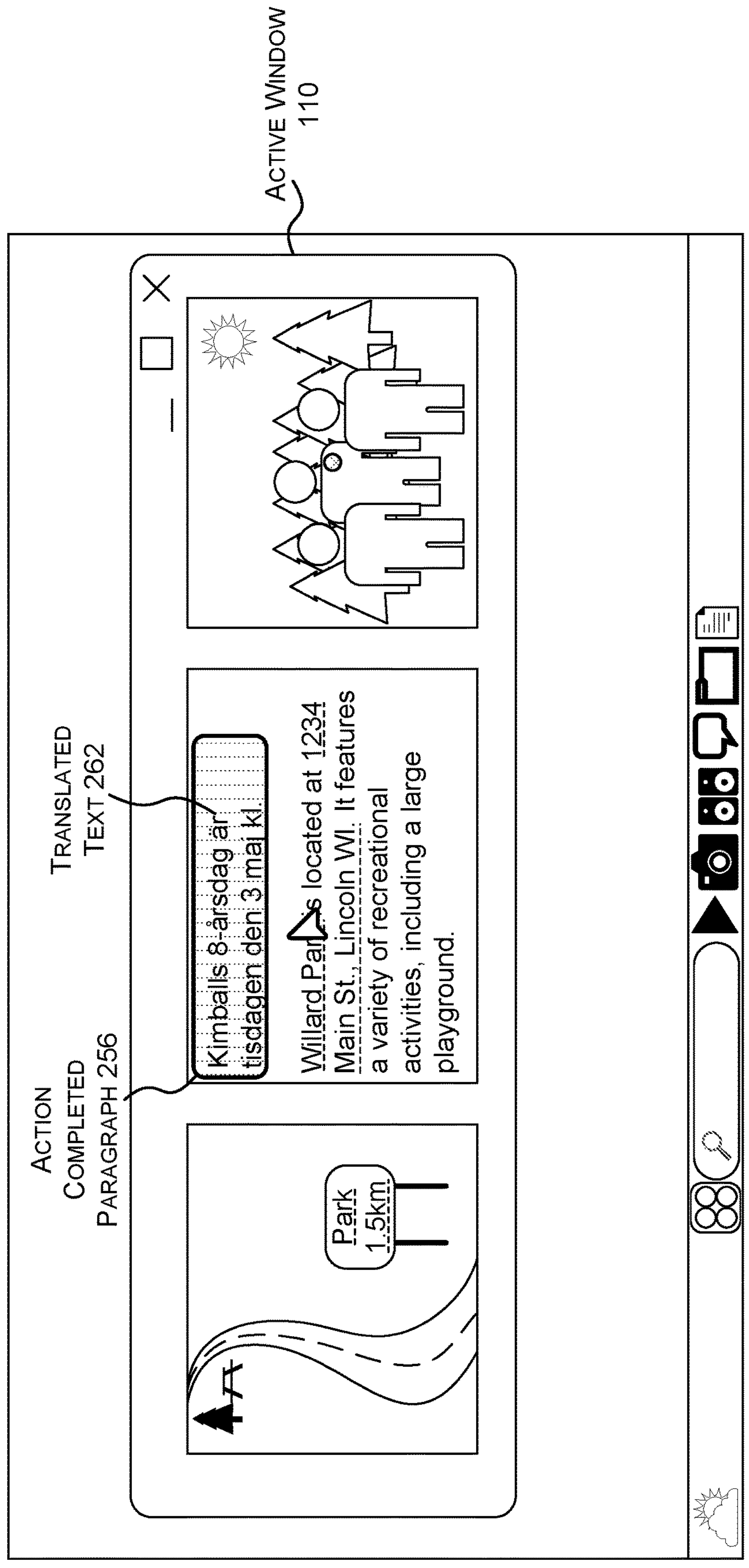
FIG. 2D illustrates the selected paragraph after the selected action has modified it.

FIG. 2D illustrates the selected paragraph 152 after the selected action 284 has modified the paragraph. In the illustrated example, the text of paragraph entity 152 has been translated into a different language, pursuant to selection of the "translate" entity action. The translated text 262 has replaced the original text of the selected paragraph 152 in active window 110. In some configurations, the translated text replaces the original text by writing the translated text to the display buffer 108. In other configurations, content analysis engine 107 places the translated text into a surface that occludes paragraph entity 152, effectively replacing it from the perspective of a user.

In some configurations, translated text 262 is highlighted as action completed paragraph 256, giving a visual indication that the selected entity action was performed. In some configurations, once an entity action has been completed, the resulting effect is semi-permanent, and will outlast discovery mode 118. In other embodiments, an effect such as translating text will be reverted when discovery mode 118 exits.

Figure 3A:
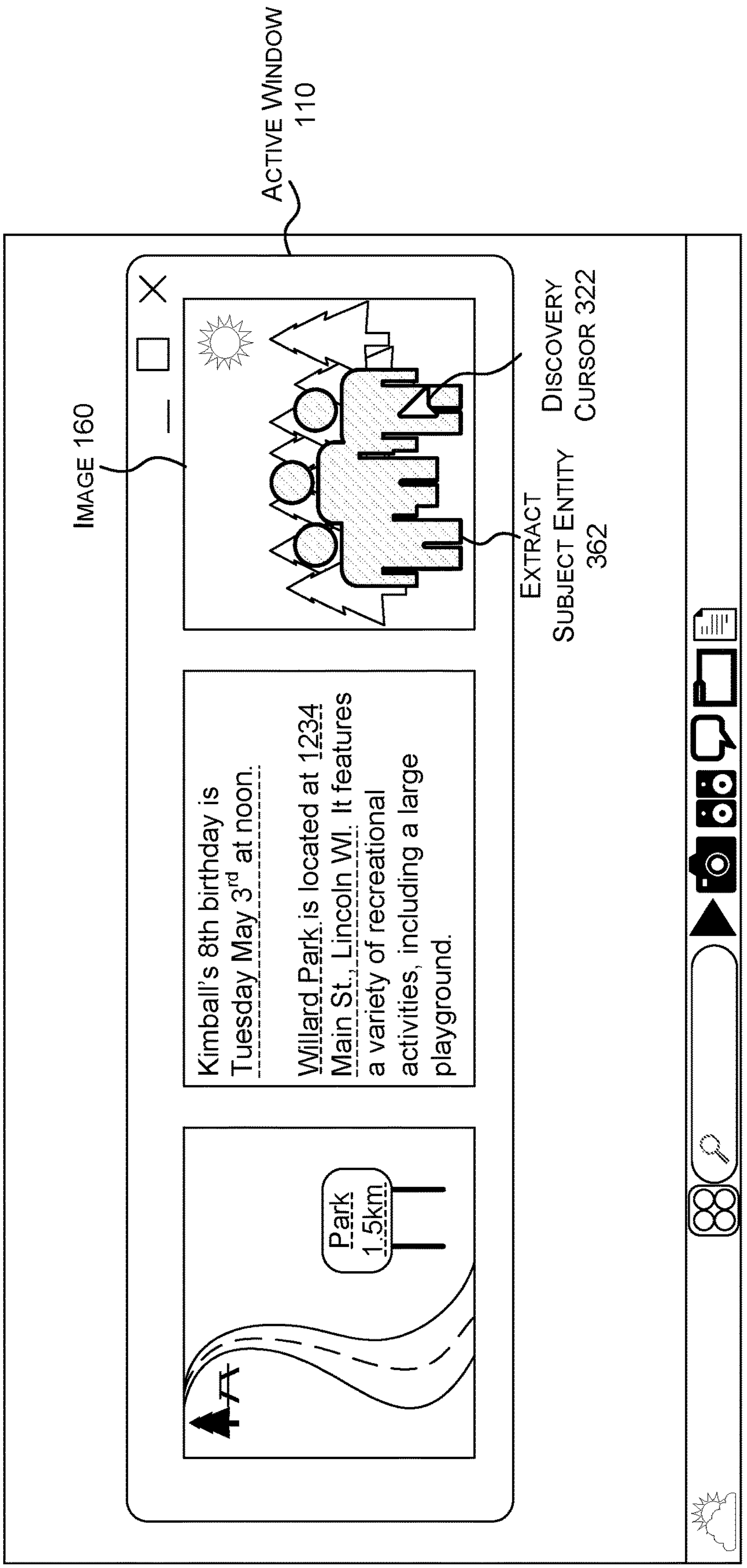
FIG. 3A illustrates a subject entity highlighted in response to the cursor hovering over the subject entity.

FIG. 3A illustrates a subject entity highlighted in response to discovery cursor hovering over the subject entity. Specifically, content analysis engine 107 has identified subject entities within image 160. Subject entities are portions of a photo or image that appear in the foreground, in focus, and are typically people, animals, objects for sale, or other significant features of a photo or image. Machine learning and/or artificial intelligence techniques may be used to identify subjects within a photo or image. Machine learning and/or artificial intelligence techniques may further be used to determine an outline of the identified subjects.

Once subjects have been identified, content analysis engine 107 may display an extract subject entity visual cue 162 within or proximate to the subject entity, as illustrated in FIG. 1C above. As illustrated in FIG. 1C, this visual cue may be relatively small compared to the subject entity itself. A visual cue may be a geometric shape, an image, or the like located within the boundaries of the subject entity or proximate to the subject entity—e.g., overlapping the subject entity in part. Other visual cues may follow a contour of the subject entity.

In some configurations, extract subject entity 362 is highlighted in response to discovery cursor 322 moving over or hovering over extract subject entity visual cue 162. In other configurations, and in contrast with text-in-image entity visual cue 142 which is highlighted when discovery cursor 322 hovers over visual cue 142 itself, extract subject entity 362 may be highlighted in response to discovery cursor 322 moving over any portion of the subject entity. In either case, extract subject entity visual cue 162 may be highlighted to indicate that it may be selected to perform an OS and/or third-party provided feature.

Figure 3B:
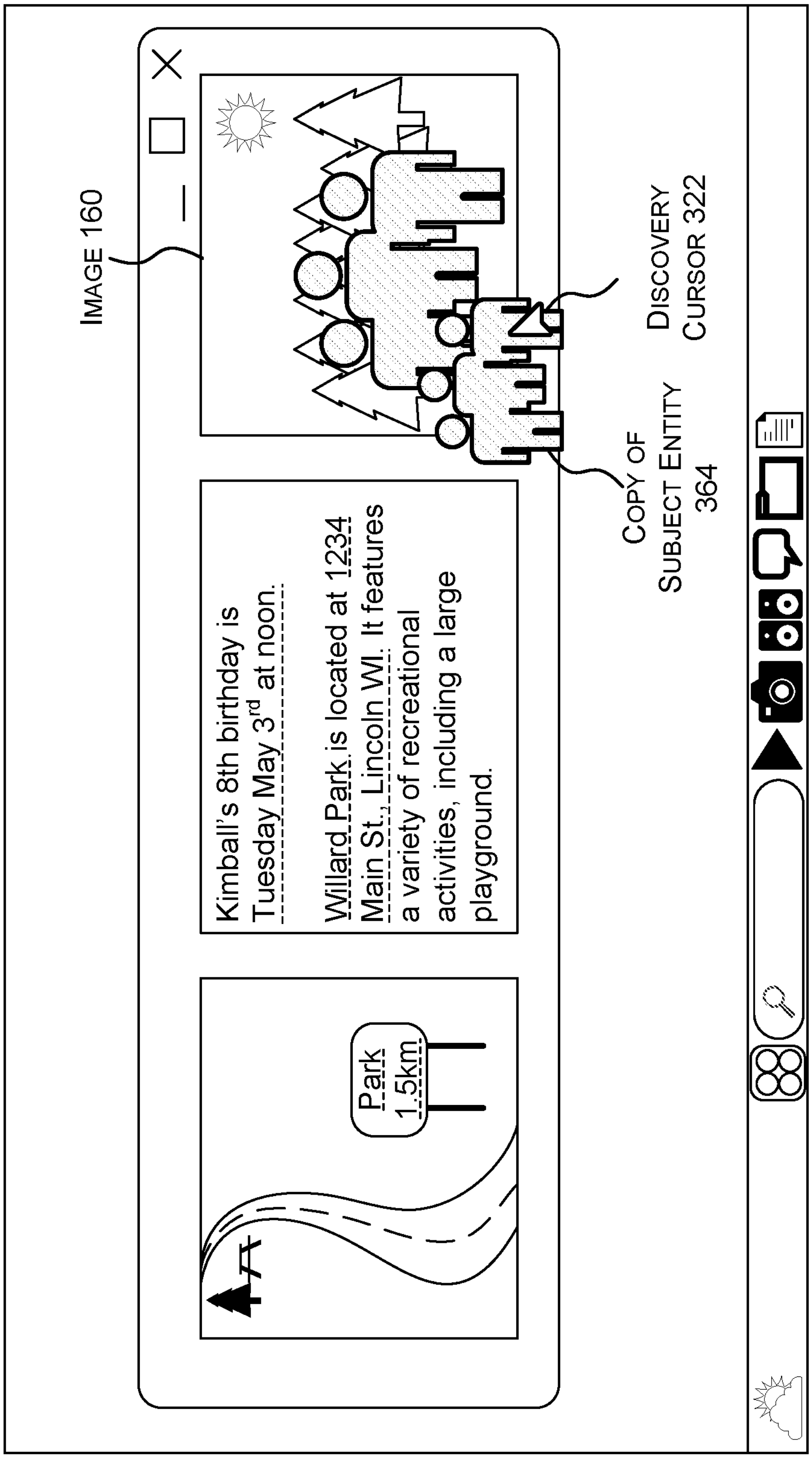
FIG. 3B illustrates a drag operation that extracts the subject entity from the image.

FIG. 3B illustrates receiving a drag operation that extracts the subject entity from the image. In this example, an OS and/or third-party provided feature-extracting the subject entity—is activated without a context menu. In some configurations, a copy of subject entity 364 may be dragged to another application where releasing the drag may initiate a copy operation.

Other OS and/or third-party provided features may be initiated in a similar manner. For example, copy and cut keyboard shortcuts may be used to copy subject entity 162 to the OS clipboard or copy it to the clipboard while removing it from image 160, respectively. When the highlighted entity contains text, an "I" cursor 224, such as that depicted in FIG. 2A, may be used to select some or all of the text, and keyboard shortcuts may similarly be used to extract, remove, or replace the selected text.

Figure 4A:
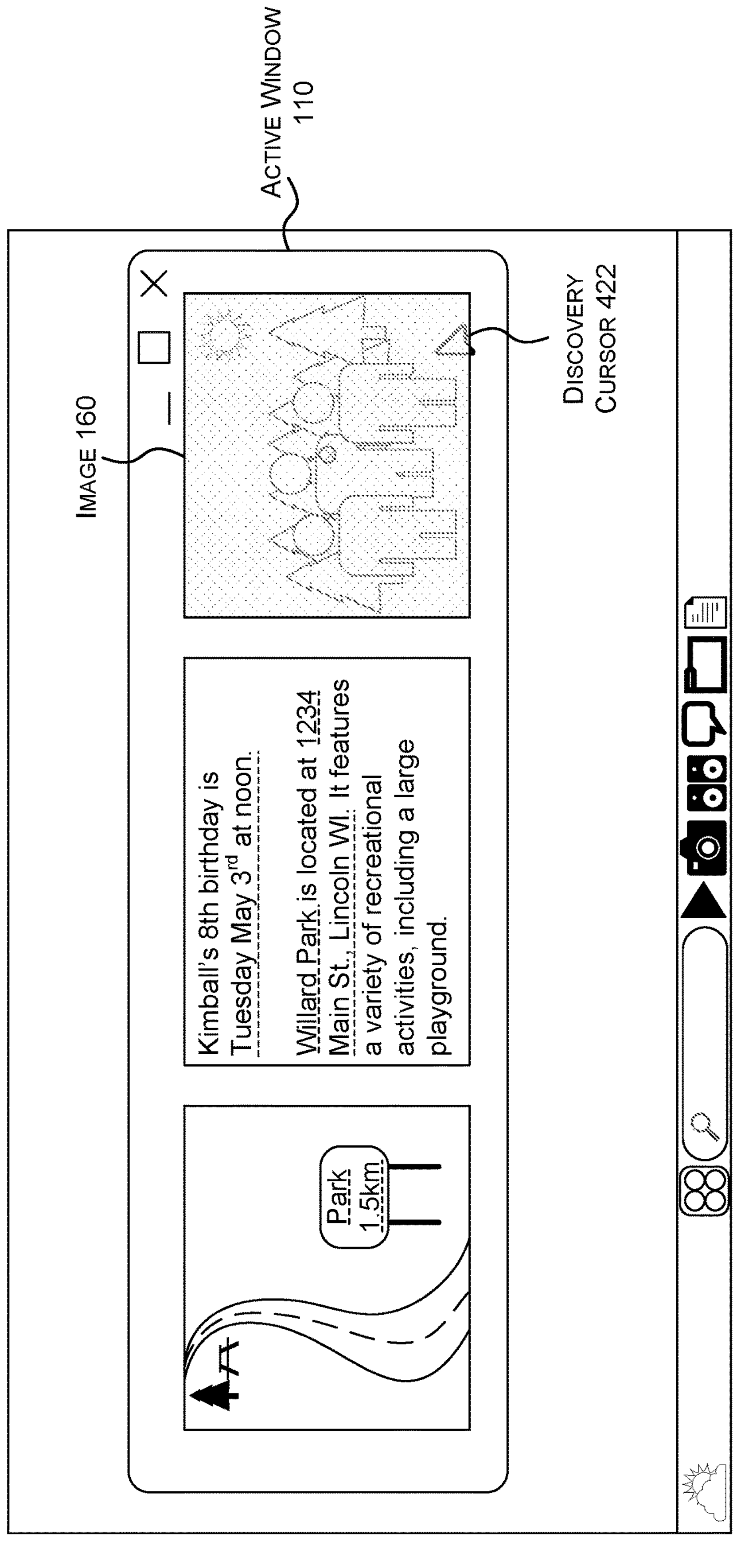
FIG. 4A illustrates an image entity that is highlighted in response to hovering over the image.

FIG. 4A illustrates an image 160 that is highlighted in response to the discovery cursor 422 hovering over a background of the image. Content analysis engine 107 may distinguish a background of a photo or image from a subject of the photo or image as discussed above in conjunction with FIG. 3A.

Image 160 highlights the movement of discovery cursor 422 over image 160 by overlaying a shadow over image 160. In some configurations, this shadow may be removed if discovery cursor 422 moves over extract subject entity visual cue 162 or subject 362, in which case subject 362 may be highlighted instead. The shadow may also be removed if discovery cursor 422 moves off of image 160.

Figure 4B:
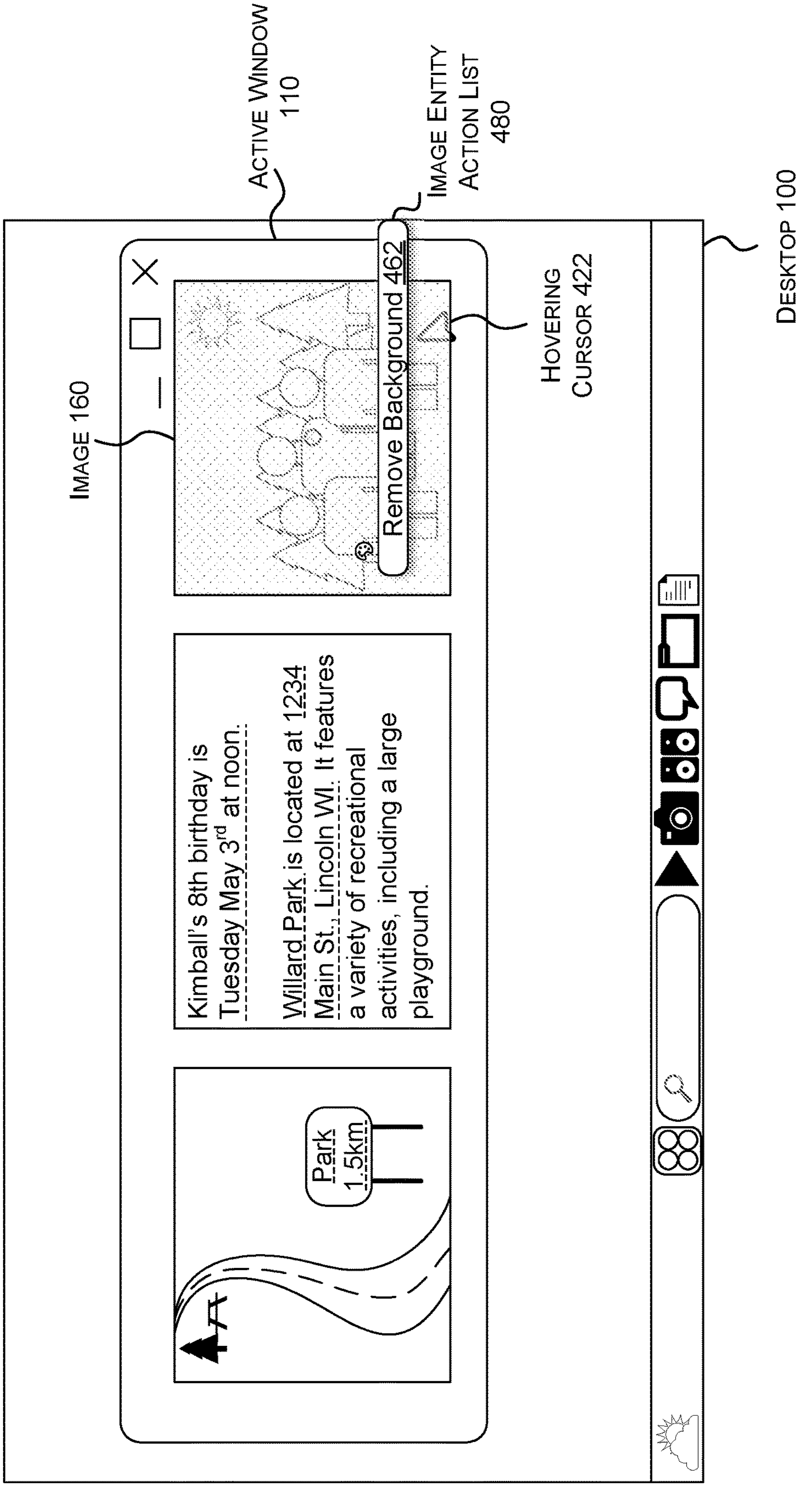
FIG. 4B illustrates an entity action list displayed in response to receiving a selection of the image entity (outside of the subject entity).

FIG. 4B illustrates an entity action list 480 displayed in response to receiving a selection of the image 160 (outside of the subject entity 362). Entity action list 480 may be selected in ways similar to the entity action lists discussed above in conjunction with FIGS. 1F and 2B. As illustrated, image entity actions list 480 has a single entity action-remove background entity action 462.

Figure 4C:
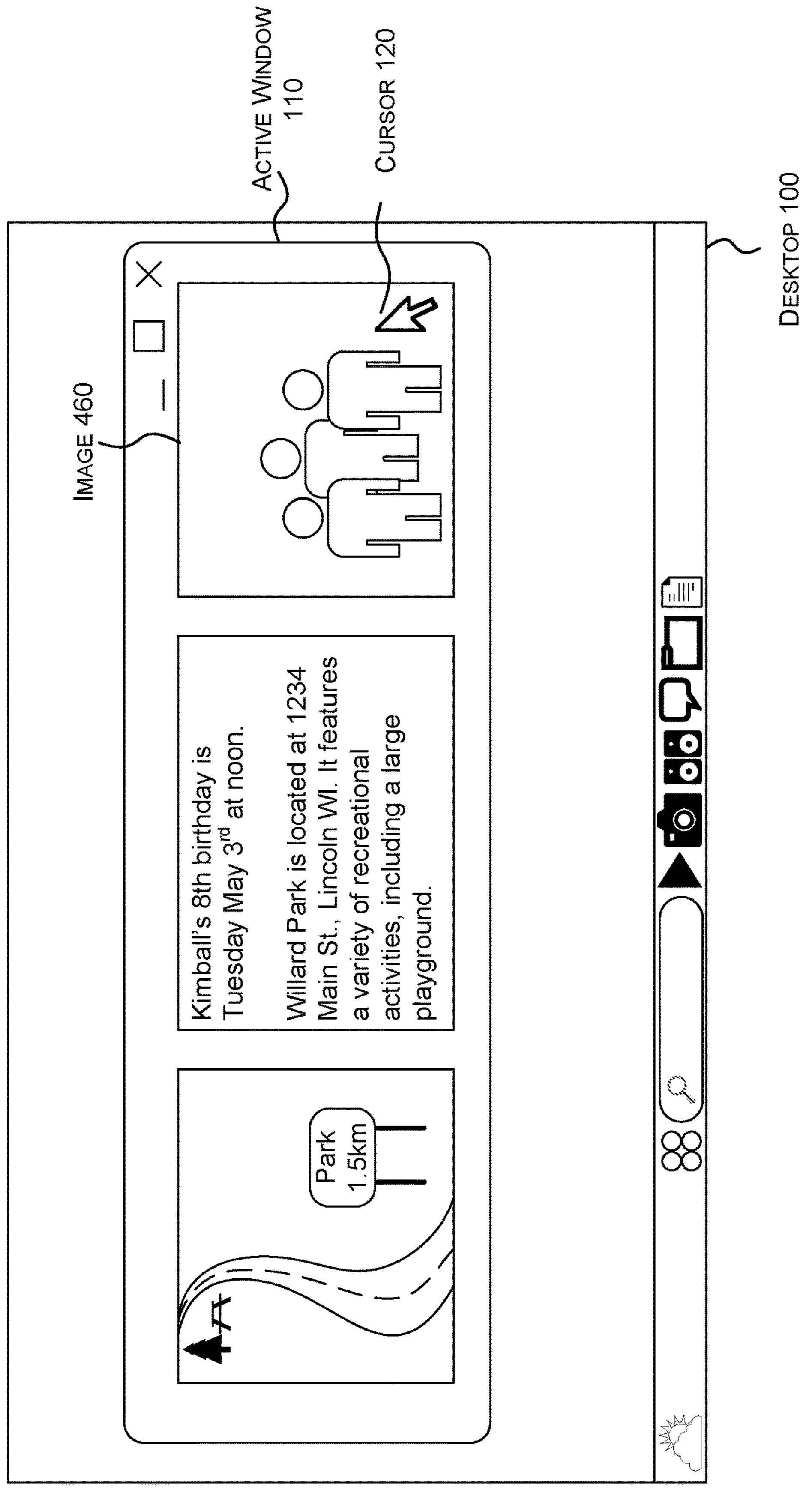
FIG. 4C illustrates the image after the selected action has removed the background.

FIG. 4C illustrates the image 160 after the remove background action 462 has removed the background. As illustrated, discovery mode 118 has exited as a result of completing the remove background action 462. However, in other configurations, discovery mode 118 may continue so long as activation key 113 remains depressed and the user has not otherwise exited discovery mode 118.

One result of applying the remove background action 462 is that discovery cursor 422 has been replaced with the OS or application default cursor 120. Furthermore, the background of image 160 has been removed. Similar to the translate entity action 284 introduced in FIG. 2C and applied in FIG. 2D, the background of image 160 may be removed by writing to the display buffer 108 directly, or by overlaying a copy of image 160 that has had the background removed. Other techniques for applying these changes are similarly contemplated.

Figure 5A:
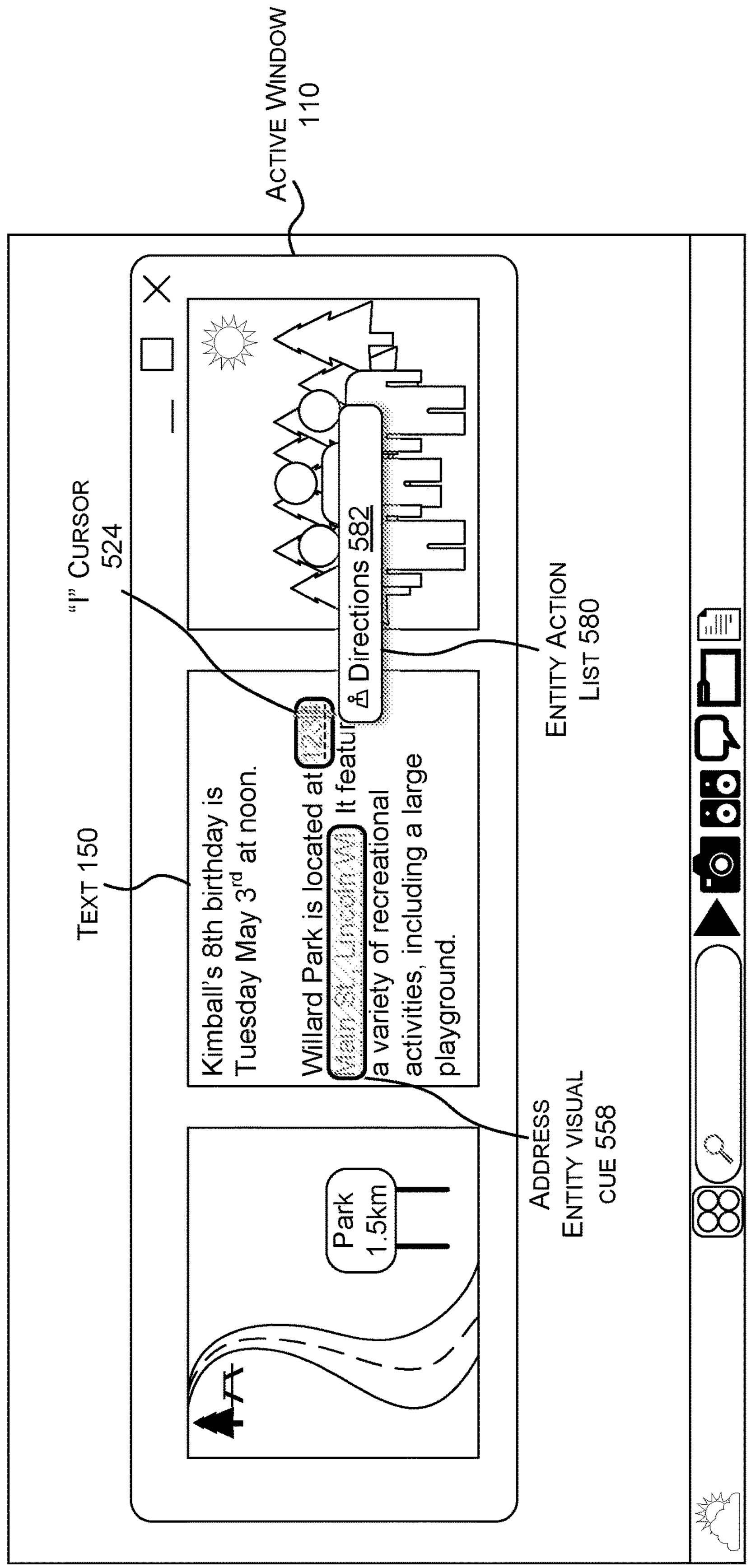
FIG. 5A illustrates an entity action list displayed in response to receiving a selection of an address entity.

FIG. 5A illustrates an entity action list 580 displayed in response to selecting an address entity visual cue 558. Content analysis engine 107 has identified that the text "1234 Main St., Lincoln WI" is an address, and generated address entity visual cue 558 accordingly. As illustrated, address entity visual cue 558 has been selected in a manner similar to the selection of text-in-image entity visual cue 142 of FIG. 1D. Specifically, "I" cursor 524 appears when the cursor moves over address entity visual cue 558. Once selected, e.g., with a mouse button click, highlighting of the address entity visual cue 558 changes, indicating that a selection was made. Entity action list 580 is also displayed in response to the selection of address entity visual cue 558. Entity action list 580 contains a single entity action: directions 582.

Figure 5B:
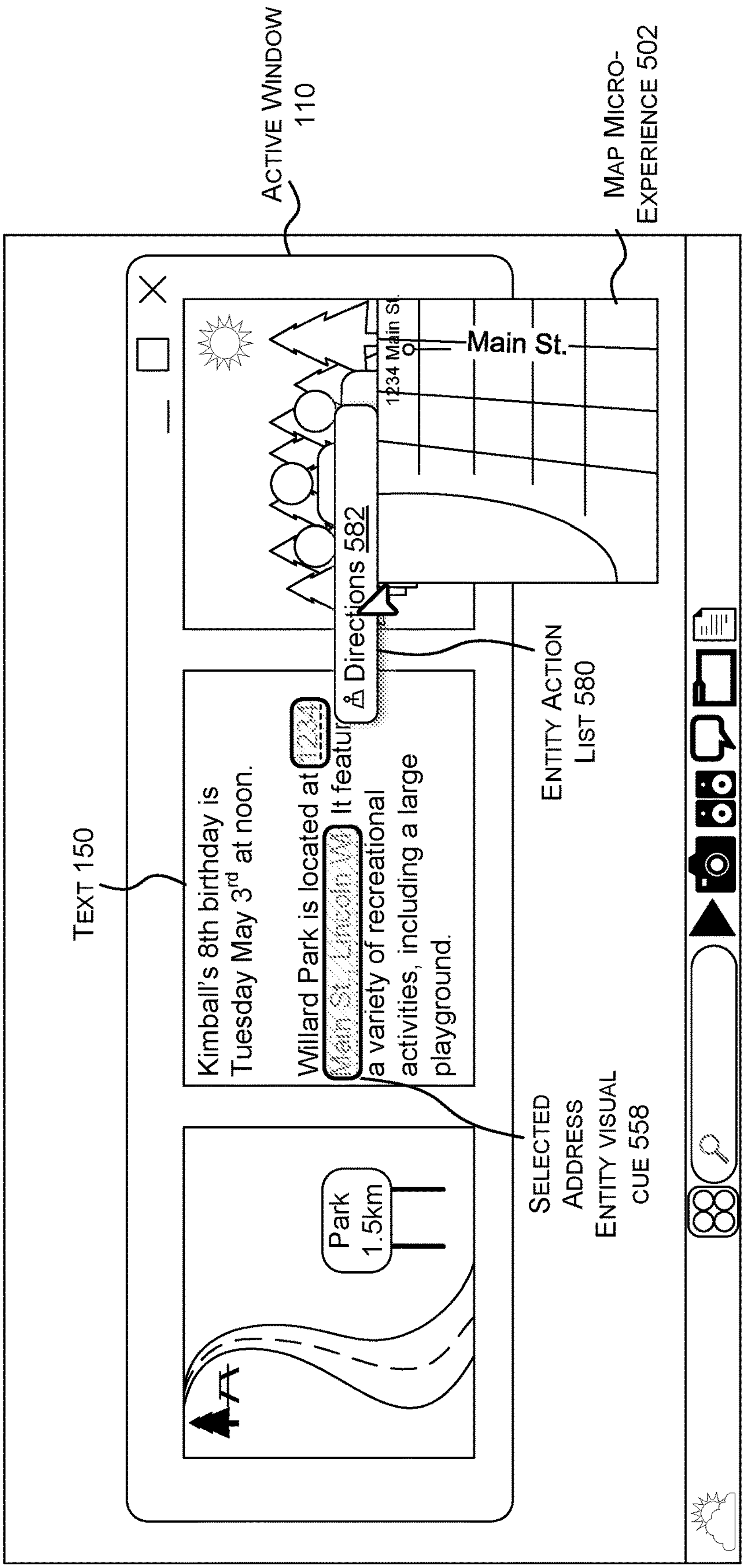
FIG. 5B illustrates an inline micro-experience displayed in response to receiving a selection of the address entity action.

FIG. 5B illustrates an inline micro-experience 502 displayed in response to selecting the address entity action 582. A micro-experience surfaces an application, widget, or other component that enables functionality to be provided that overlays, is proximate to, or otherwise associated with the active window. A micro-experience enables a feature to be provided as part of the current user experience while maintaining focus on the current application.

Map micro-experience 502 may be a pop-up, dialog, or other UI control that presents OS and/or third-party functionality based on the content of address entity visual cue 558. In this example, map micro-experience 502 presents a street map of the address associated with address entity visual cue 558. Map micro-experience 502 is one example of a micro-experience. An email address entity may support a micro-experience that brings up a list of recent communications with the underlying email address. An online encyclopedia micro-experience may display a definition of a selected word. In some configurations, micro-experiences may be interacted with similar to a web page. At the same time, micro-experiences are not limited to displaying HTML, and may in fact utilize features of OS 106 or other applications.

Figure 6A:
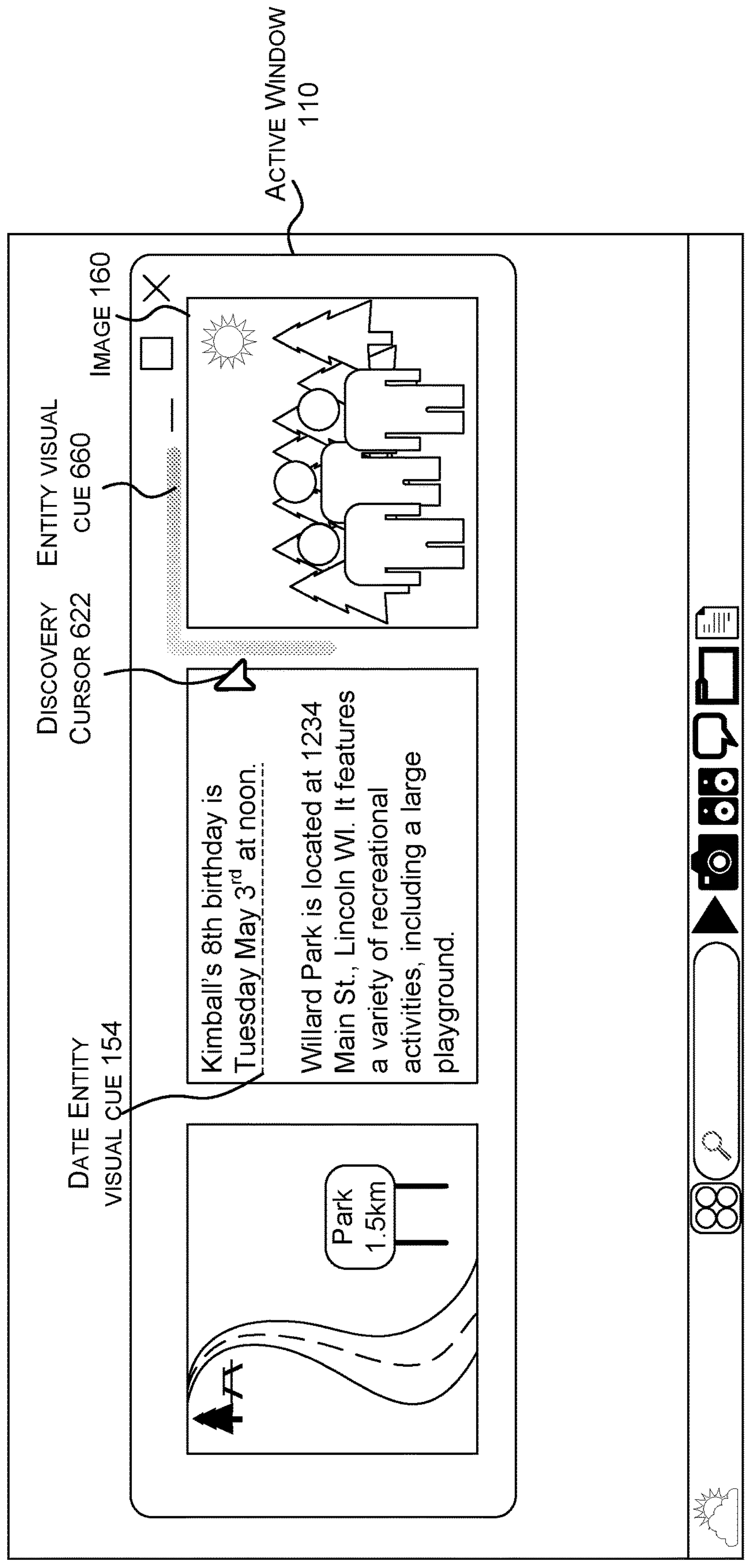
FIGS. 6A-6C illustrate highlighting particular visual cues or particular portions of visual cues that are close to the discovery cursor.
Figure 6B:
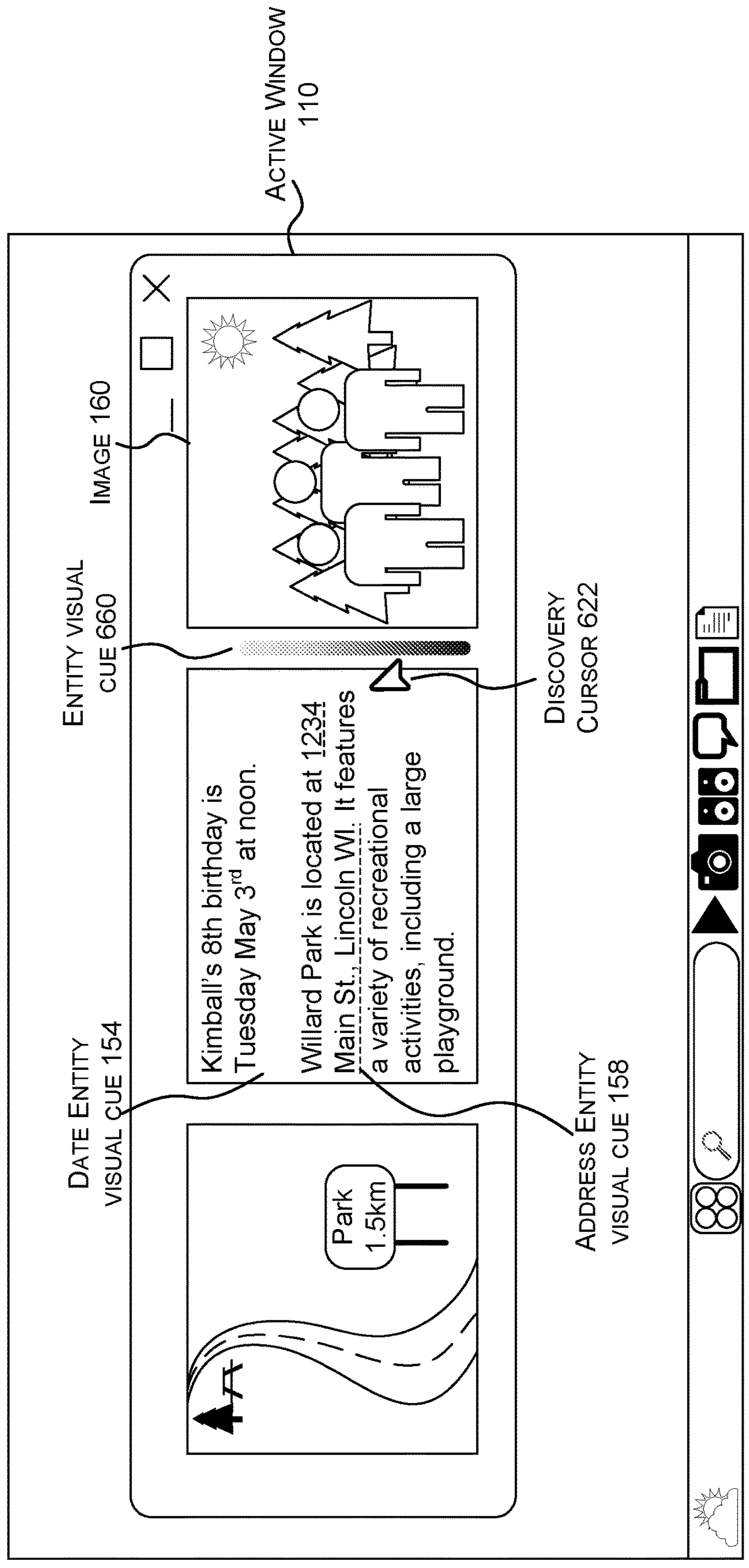
Figure 6C:
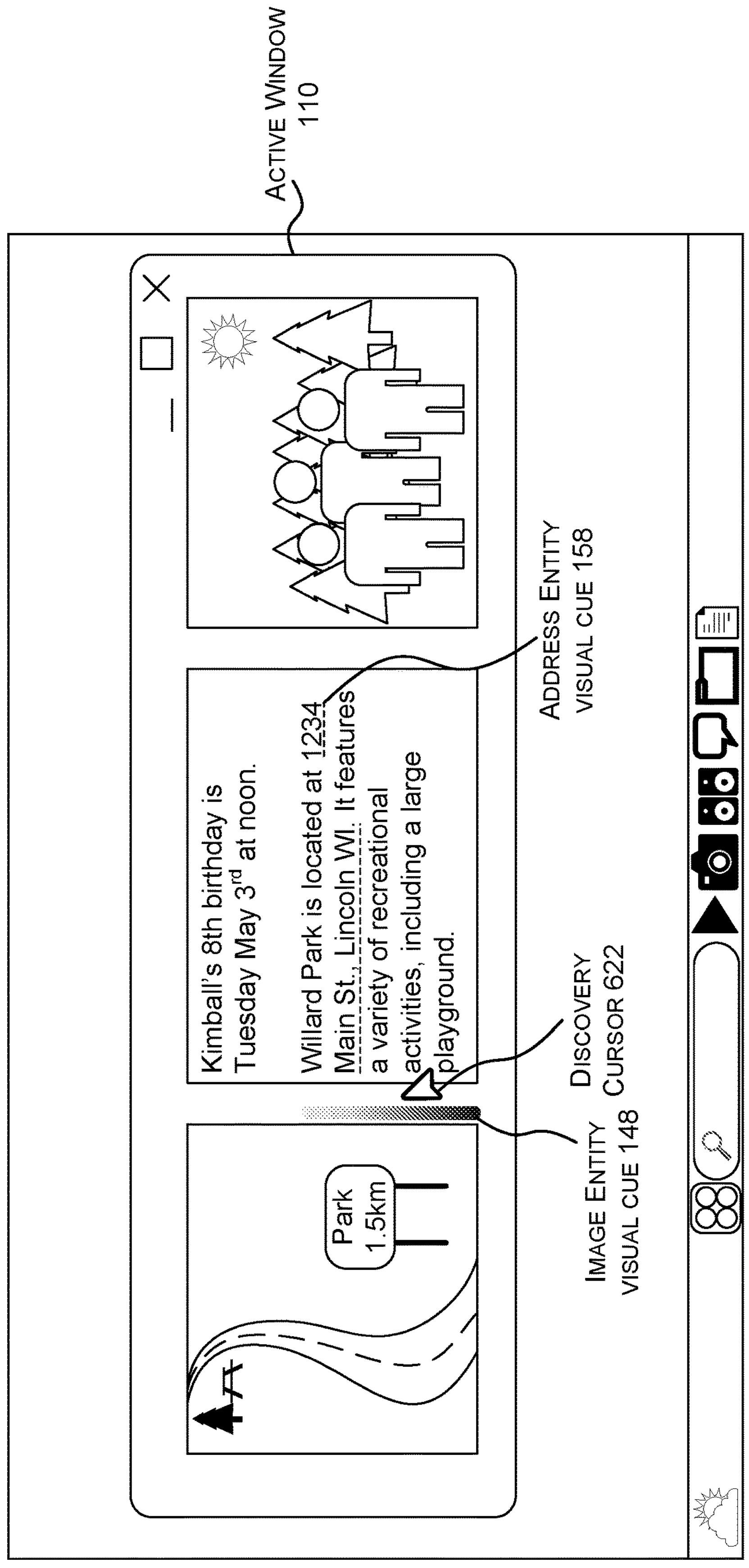

FIGS. 6A-6C illustrate highlighting particular visual cues that are close to the discovery cursor. In some configurations, particular entity visual cues may be selectively displayed based on proximity to discovery cursor 622. This technique may be employed to reduce the number of entity visual cues that are overlayed on top of active window 110, similar to the reasons for displaying nested entity visual cues. Specifically, reducing the number of visual cues reduces screen clutter and processing time.

As illustrated in FIG. 6A, discovery cursor 622 is closest to entity visual cue 660 associated with image 160 and date entity visual cue 154, and therefore these entity visual cues are highlighted for display. Discovery cursor 622 is also proximate to paragraph entity 152, but in this configuration paragraph entity 152 is not highlighted with a visual cue until discovery cursor 622 moves over it.

In some configurations, an entity visual cue associated with a particular entity is not displayed in full. For example, entity visual cue 660 could encircle image 160 similar to how image entity visual cue 148 encircles image 140 in FIG. 1C. However, in order to emphasize that entity visual cue 660 is selected for display in response to the location of discovery cursor 622 only a portion closest to discovery cursor 622 is displayed. The portion selected for display may be updated as the location of discovery cursor 622 changes.

How close an entity visual cue has to be to the discovery cursor 622 in order to be highlighted is configurable, such as by an administrator or end user. Furthermore, one or more filters may be applied to determine which entity visual cues to highlight, and at what distance from discovery cursor 622. These filters may be built into content analysis engine 107 or provided by a plugin. Such filters may also be configurable.

FIG. 6B illustrates the discovery cursor 622 having moved, and the portion of entity visual cue 660 that is highlighted moving with it. At the same time, date entity visual cue 154 is no longer highlighted, while address entity visual cue 158 is.

Similarly, FIG. 6C illustrates discovery cursor having moved again, this time in proximity to image entity visual cue 148. At the same time, the highlight of address entity visual cue 158 remains as it is still proximate to discovery cursor 622.

Figure 7:
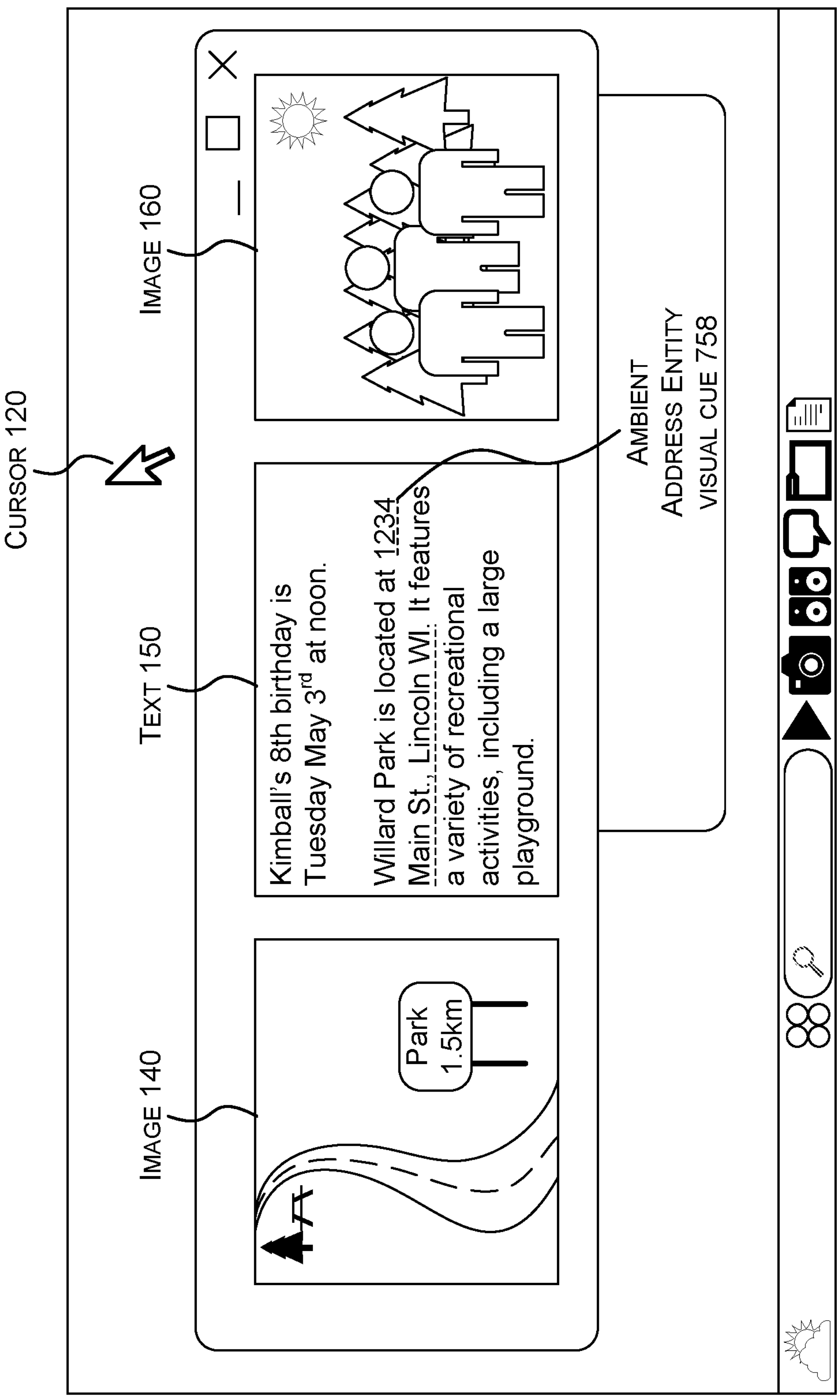
FIG. 7 illustrates automatically triggering the discovery mode in which an address entity visual cue is overlaid on top of the active window without explicit user activation of a discovery mode.

FIG. 7 illustrates an ambient mode in which discovery mode 118 is triggered automatically. Specifically, ambient address entity visual cue 758 is overlaid on top of the active window 110 without explicit user activation of discovery mode 118. Triggering discovery mode 118 automatically enables the availability of OS and/or third-party provided features to be surfaced without a user having to manually enter discovery mode 118. In some configurations, discovery mode 118 is automatically triggered when the applicable region 115 changes, when a window scrolls, when a new application is launched, or when previously unanalyzed content comes into view. A user may still manually enter discovery mode 118 while in the automatically-triggered discovery mode, at which point additional visual cues may be surfaced.

In order to reduce the chance of incorrect, ineffective, or unwanted entity visual cues, when discovery mode 118 is triggered automatically, the type, location, and/or number of entity visual cues may be limited. For example, address entities may be allowed, but not subject entities. As another example, entity visual cues may only be allowed within a prescribed distance of the discovery cursor 622 when discovery mode 118 has been entered automatically.

In some configurations, when discovery mode 118 is automatically triggered, the type, location, and number of entity visual cues allowed may be customized based on individual usage history. For example, suppose a user had previously activated the address entity visual cue 558 depicted in FIG. 5A. From this usage history, the same user may be more likely to be presented with address entity visual cues when discovery mode 118 has been automatically triggered. This history is reflected in FIG. 7, which only displays ambient address entity visual cue 758 in contrast with the more numerous visual cues displayed in FIG. 1C.

Figure 8:
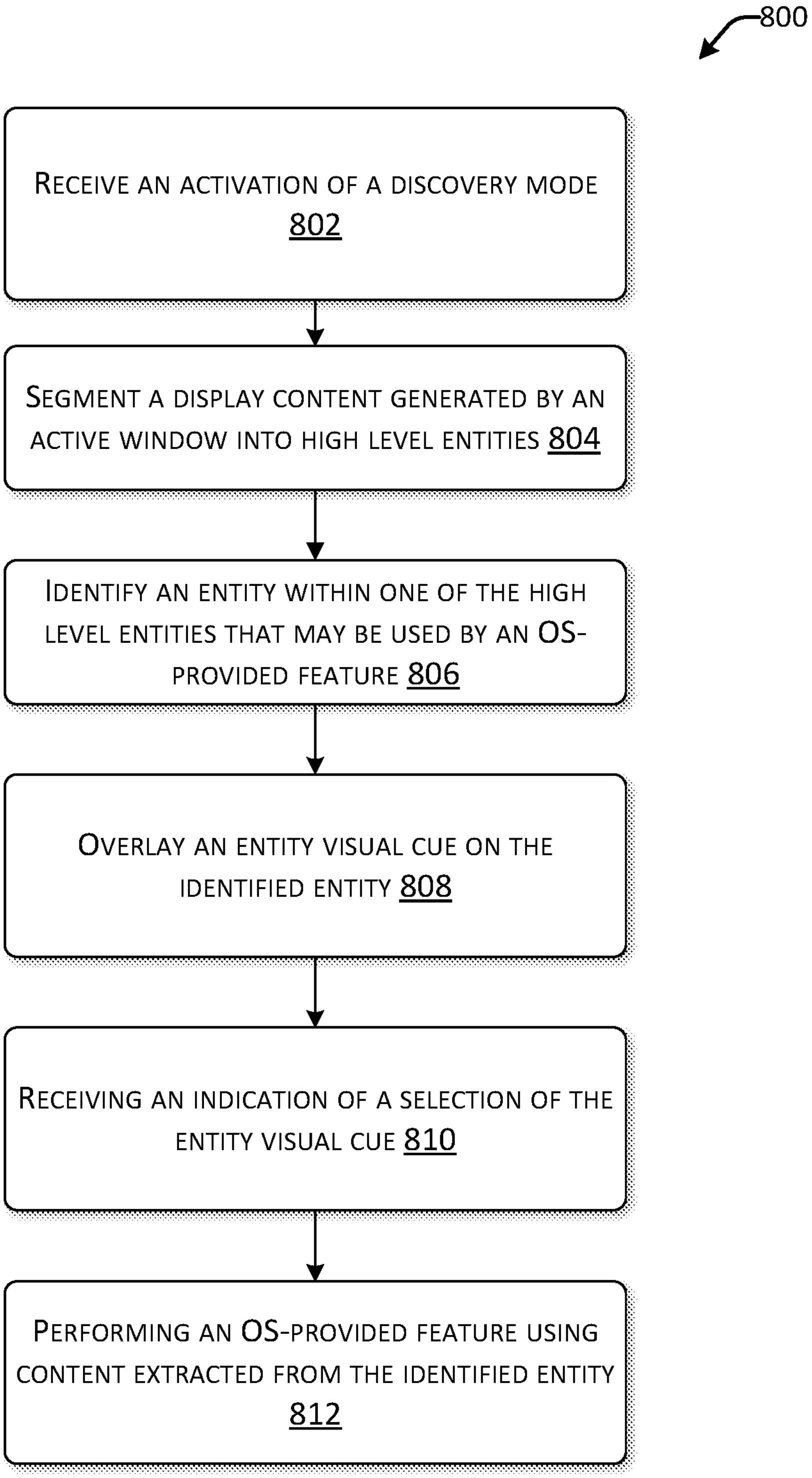
FIG. 8 is a flow diagram of an example method for a feature discovery layer.

With reference to FIG. 8, routine 800 begins at operation 802, where an activation 104 of a discovery mode 118 is received. The activation 104 may be in the form of pressing and holding an activation key 113 associated with an activation button 102 displayed by OS 106.

Next at operation 804, display content extracted from a display buffer 108 of an active window 110 is segmented into high level entities. For example, blocks of text, images, UI controls, and other recognizable types of content may be identified.

Next at operation 806, an entity is identified within one of the high level entities. For example, a mailing address entity may be identified from text within text 150.

Next at operation 808, an entity visual cue is overlaid on top of the entity identified by operation 806. For example, an address entity visual cue 558 is displayed as an underline proximate to the text of the associated entity.

Next at operation 810, an indication of a selection of the address entity visual cue 558 is received. This indication may be in the form of a mouse click.

Next at operation 812, an OS and/or third-party provided feature is activated using the entity associated with the selected entity visual cue. Continuing the example, an OS and/or third-party provided feature that displays a map micro-experience 502 may be launched with the address of the selected address entity visual cue 558.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 9:
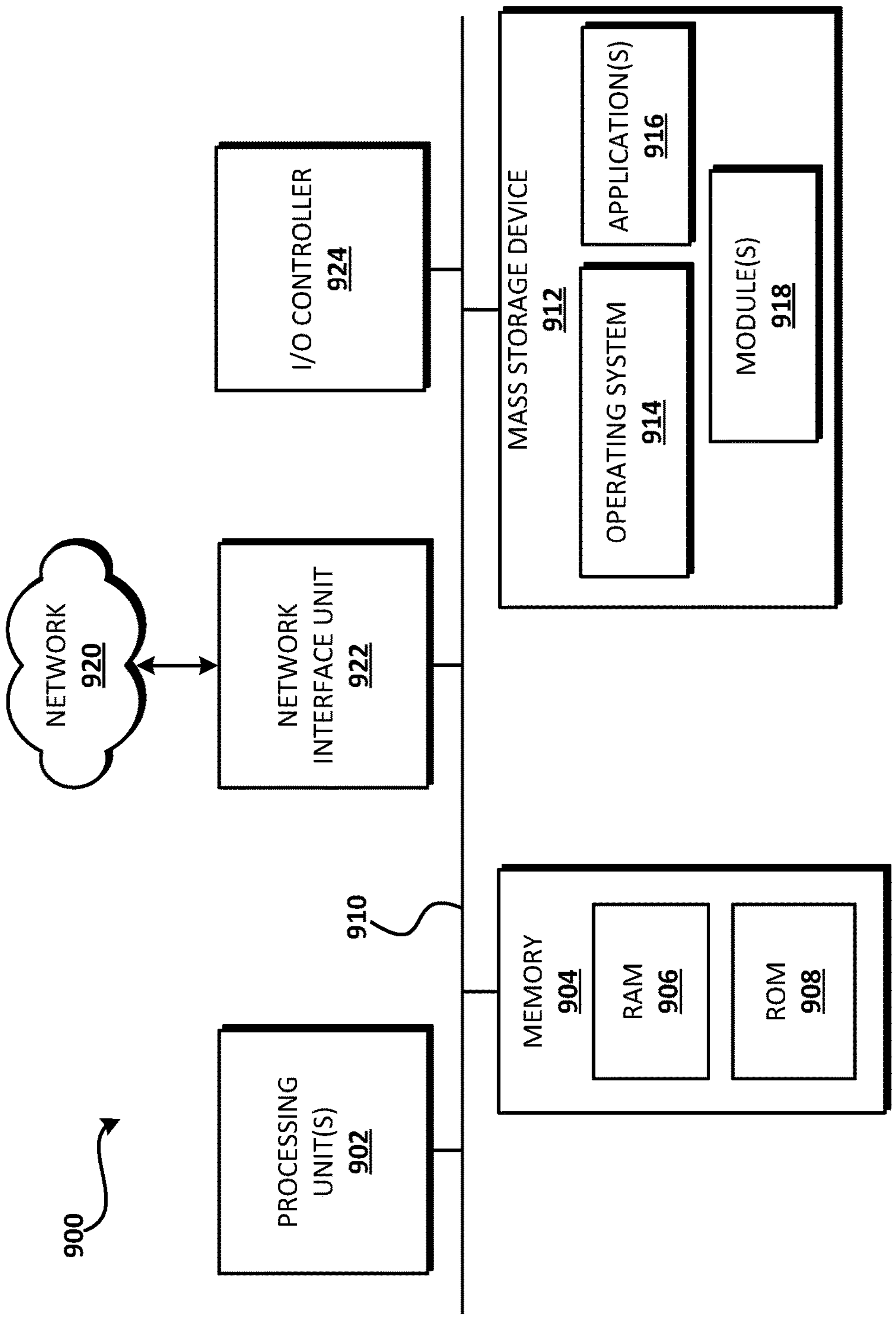
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the systems described herein, capable of executing computer instructions (e.g., a module or a program component described herein). The computer architecture 900 illustrated in FIG. 9 includes processing unit(s) 902, a system memory 904, including a random-access memory 906 ("RAM") and a read-only memory ("ROM") 908, and a system bus 910 that couples the memory 904 to the processing unit(s) 902.

Processing unit(s), such as processing unit(s) 902, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

Figure 10:
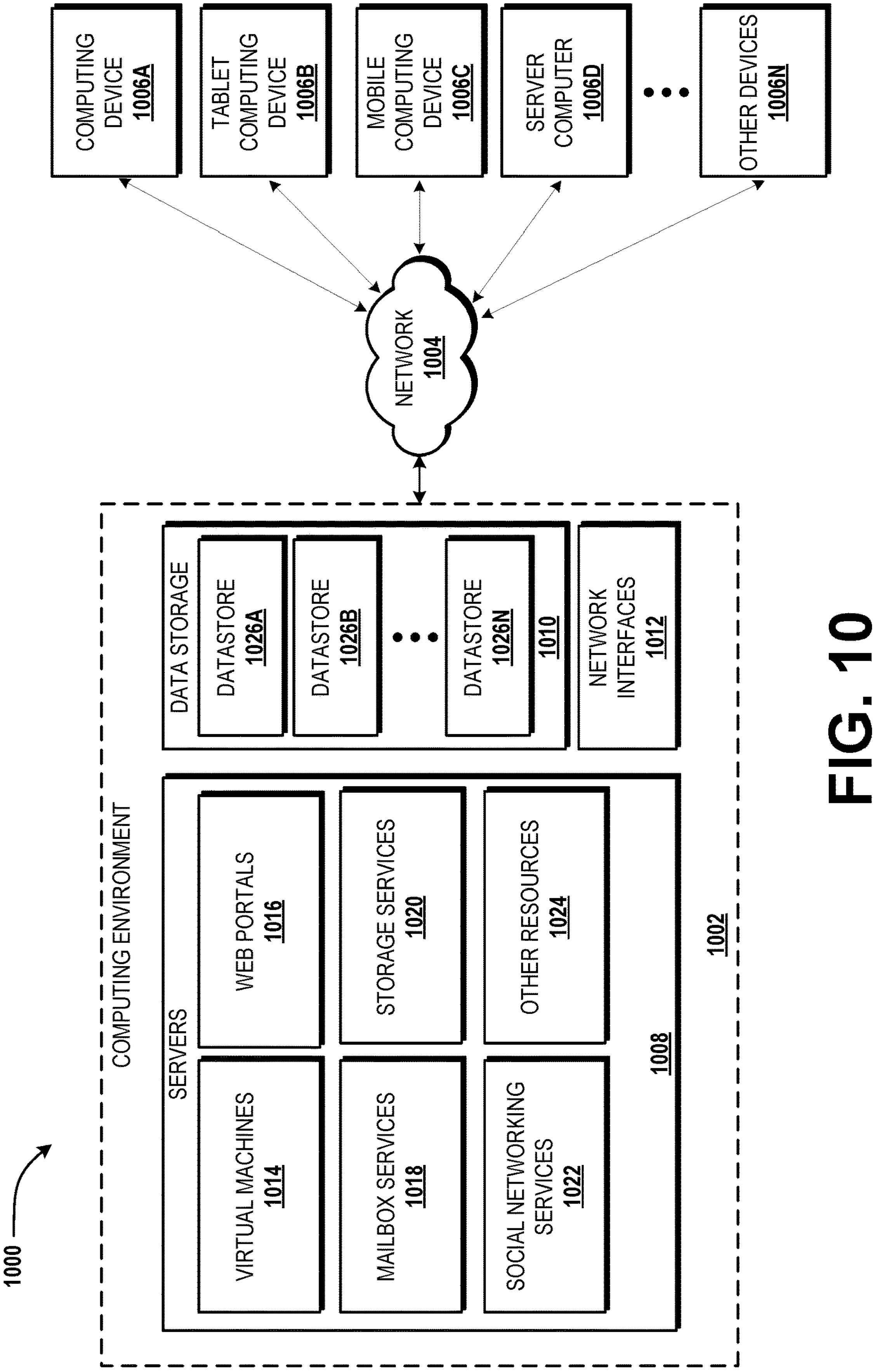
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

Accordingly, the distributed computing environment 1000 can include a computing environment 1002 operating on, in communication with, or as part of the network 1004. The network 1004 can include various access networks. One or more client devices 1006A-1006N (hereinafter referred to collectively and/or generically as "clients 1006" and also referred to herein as computing devices 1006) can communicate with the computing environment 1002 via the network 1004. In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002.

In various examples, the computing environment 1002 includes servers 1008, data storage 1010, and one or more network interfaces 1012. The servers 1008 can host various services, virtual machines, portals, and/or other resources. In the illustrated configuration, the servers 1008 host virtual machines 1014, Web portals 1016, mailbox services 1018, storage services 1020, and/or, social networking services 1022. As shown in FIG. 10 the servers 1008 also can host other services, applications, portals, and/or other resources ("other resources") 1024.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more servers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the servers 1008 and/or other data. That is, the datastores 1026 also can host or store web page documents, word documents, presentation documents, data structures, algorithms for execution by a recommendation engine, and/or other data utilized by any application program. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects.

The present disclosure is supplemented by the following example clauses:

Example 1: A method comprising: receiving an indication that a discovery mode has been activated; retrieving content displayed by an active window; identifying an image within the retrieved content; identifying a text entity within the identified image; determining that the text entity is applicable to an OS or third-party provided feature; overlaying an entity visual cue onto the active window proximate to the text entity; receiving an indication of a selection of the entity visual cue; and invoking the OS or third-party provided feature.

Example 2: The method of Example 1, wherein invoking the OS or third-party feature comprises providing the OS or third-party provided feature with the text entity.

Example 3: The method of Example 1, wherein the OS or third-party feature modifies the content displayed by the active window, launches an inline micro-experience, crops an image, or exports an image.

Example 4: The method of Example 1, wherein the discovery mode comprises an ambient mode that analyzes content displayed by the active window when previously unanalyzed content comes into view.

Example 5: The method of Example 4, wherein a number, location, or type of visual cues is limited when in ambient mode.

Example 6: The method of Example 5, wherein the number, location, and type of visual cues displayed while in ambient mode is customized based on an individual usage history.

Example 7: The method of Example 1, wherein the content displayed by the active window is retrieved from a display buffer after the active window has drawn the content to the display buffer.

Example 8: The method of Example 1, wherein the content displayed by the active window is retrieved from a visible portion of the active window and a non-visible portion of the active window.

Example 9: A system comprising: a processing unit; and a computer-readable storage medium having computer-executable instructions stored thereupon, which, when executed by the processing unit, cause the processing unit to: receive an indication that a discovery mode has been activated; retrieve content displayed by an active window; identify an image within the retrieved content; identify an image subject entity within the identified image; determine that the image subject entity is applicable to an OS or third-party provided feature; overlay an entity visual cue onto the active window proximate to the image subject entity; receive an indication of a selection of the entity visual cue; and invoke the OS or third-party provided feature.

Example 10: The system of Example 9, wherein the entity visual cue comprises a shape displayed within or proximate to the image subject entity.

Example 11: The system of Example 10, wherein the computer-executable instructions further cause the processing unit to: highlight the entity visual cue in response to an indication of a system cursor moving over or proximate to the image subject entity.

Example 12: The system of Example 10, wherein the computer-executable instructions further cause the processing unit to: highlight the image subject entity in response to an indication of a system cursor moving over or proximate to the entity visual cue.

Example 13: The system of Example 9, wherein the OS or third-party feature extracts the image subject entity from the identified image.

Example 14: The system of Example 9, wherein the computer-executable instructions further cause the processing unit to: identify a background portion of the image; and highlight the image in response to a determination that a system cursor moved over the background portion of the image.

Example 15: The system of Example 9, wherein the computer-executable instructions further cause the processing unit to: display an entity action list in response to the selection of the entity visual cue; and receive a selection from the entity action list that selects the OS or third-party provided feature.

Example 16: A computer-readable storage medium having encoded thereon computer-readable instructions that when executed by a processing unit causes a system to: receive an indication that a discovery mode has been activated; retrieve content displayed by an active window; identify a paragraph entity within the retrieved content; determine that the paragraph entity is applicable to an OS or third-party provided feature; overlay an entity visual cue onto the active window proximate to the paragraph entity in response to a discovery cursor moving over or proximate to the paragraph entity; receive an indication of a selection of the entity visual cue; and invoke the OS or third-party provided feature.

Example 17: The computer-readable storage medium of Example 16, wherein the instructions further cause the processing unit to: extract text depicted in the paragraph entity from the retrieved content; and provide the extracted text to the OS or third-party provided feature.

Example 18: The computer-readable storage medium of Example 16, wherein a system cursor changes to the discovery cursor in response to entering the discovery mode, and wherein the discovery cursor changes to an "I" cursor in response to moving over or proximate to the paragraph entity.

Example 19: The computer-readable storage medium of Example 18, wherein the instructions further cause the processing unit to: display a caret proximate to the "I" cursor within the paragraph entity; receive an indication of an edit command; applying the edit command at a location of the caret; and modify the content displayed by the active window to reflect a result of the edit command.

Example 20: The computer-readable storage medium of Example 18, wherein the instructions further cause the processing unit to: select text from the paragraph entity at a location of the "I" cursor in response to a text selection command.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

retrieving a contents of a display buffer of an active window of an application;

identifying a text entity within the retrieved contents, wherein the text entity is located within a parent entity of the retrieved contents;

determining that the text entity is usable by an OS or third-party provided feature;

rendering an overlay layer over the active window of the application, wherein the overlay layer includes an entity visual cue that appears next to, underneath, around, over, or partially over the text entity, wherein the overlay layer is rendered without participation of the application, and wherein the entity visual cue is rendered in response to a system cursor being over a parent entity visual cue;

receiving, at the overlay layer, an indication of a selection of the entity visual cue; and invoking the OS or third-party provided feature.

2. The method of claim 1, wherein invoking the OS or third-party feature comprises providing the OS or third-party provided feature with the text entity.

3. The method of claim 1, wherein the OS or third-party feature modifies the contents of the display buffer without participation of the application.

4. The method of claim 1, wherein the contents of the display buffer is retrieved and the text entity is identified in response to previously unanalyzed contents of the display buffer coming into view.

5. The method of claim 1, wherein the entity visual cue is one of a plurality of entity visual cues that highlight the contents of the display buffer, wherein the plurality of entity visual cues are at least one of a plurality of entity visual cue types, and wherein entity visual cues having a same entity visual cue type are selected from the plurality of entity visual cues for display.

6. The method of claim 1, wherein the entity visual cue is one of a plurality of entity visual cues derived from the contents of the display buffer, wherein two or more of the plurality of entity visual cues that are located within a defined distance of a cursor are highlighted in the overlay layer.

7. The method of claim 1, wherein the contents of the active window of the application is retrieved from the display buffer after the contents has been drawn to the display buffer, wherein the display buffer comprises memory in a computing device storing image data that is read by a graphics processing unit for display.

8. The method of claim 7, wherein the contents of the active window of the application comprises a visible portion of the active window and a non-visible portion of the active window.

9. A system comprising:

a processing unit; and a computer-readable storage medium having computer-executable instructions stored thereupon, which, when executed by the processing unit, cause the processing unit to:

retrieve a contents of a display buffer of a window of an application;

identify a text entity within the retrieved contents;

determine that the text entity is usable by an OS or third-party provided feature;

render an overlay window over the window of the application, wherein the overlay window includes an entity visual cue that appears next to, underneath, around, over, or partially over the text entity, wherein the overlay window is rendered without participation of the application;

highlight the entity visual cue in response to an indication of a cursor moving within a defined distance of the text entity but not over the text entity;

receive, at the overlay window, an indication of a selection of the entity visual cue; and invoke the OS or third-party provided feature.

10. The system of claim 9, wherein the OS or third-party feature translates the text entity to a different language.

11. The system of claim 9, wherein the text entity is located within a parent entity of the retrieved contents, and wherein the entity visual cue is rendered in response to a system cursor moving over a parent entity visual cue.

12. The system of claim 9, wherein the computer-executable instructions further cause the processing unit to:

highlight a portion of the entity visual cue closest to a cursor.

13. A non-transitory computer-readable storage medium having encoded thereon computer-readable instructions that when executed by a processing unit causes a system to:

retrieve a contents of a display buffer of a window of an application;

identify a text entity within the retrieved contents;

determine that the text entity is usable by an operating system or third-party provided feature;

render, with the operating system, an overlay layer over the window of the application, wherein the overlay layer includes an entity visual cue that appears next to, underneath, around, over, or partially over the text entity, wherein the overlay layer is rendered without participation of the application;

enter a discovery mode, wherein a system cursor changes to a discovery cursor in response to entering the discovery mode, wherein the discovery cursor is visually distinct from the system cursor, and wherein the discovery cursor changes to an "I" cursor in response to moving over the text entity;

receive, at the overlay layer, a user interface command that selects the entity visual cue, wherein the user interface command would otherwise be received by the active window of the application; and invoke the OS or third-party provided feature.

14. The non-transitory computer-readable storage medium of claim 13, wherein the instructions further cause the processing unit to:

display a caret within a defined distance of the "I" cursor within the text entity;

receive an indication of an edit command;

apply the edit command at a location of the caret; and modify the window to reflect a result of the edit command.

15. The non-transitory computer-readable storage medium of claim 13, wherein the instructions further cause the processing unit to:

select text from the text entity at a location of the "I" cursor in response to a text selection command; and perform an operation on the selected text.

16. The non-transitory computer-readable storage medium of claim 13, wherein the contents of the display buffer includes non-image based content.

17. The non-transitory computer-readable storage medium of claim 16, wherein the contents of the display buffer includes application-generated content.

* * * * *